US012707170B2

(12) United States Patent
Matsunaga et al.

(10) Patent No.: US 12,707,170 B2
(45) Date of Patent: Aug. 11, 2026

(54) PHOTO VOLTAIC IMAGE SENSOR

(71) Applicant: OmniVision Technologies, Inc., Santa Clara, CA (US)

(72) Inventors: Yoshiyuki Matsunaga, Kyoto (JP); Mabuchi Keiji, Cupertino, CA (US); Lindsay Grant, Campbell, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 292 days.

(21) Appl. No.: 18/463,560

(22) Filed: Sep. 20, 2023

(65) Prior Publication Data

US 2025/0097602 A1 Mar. 20, 2025

(51) Int. Cl.

*H04N 25/771* (2023.01)
*H04N 25/53* (2023.01)
*H04N 25/62* (2023.01)
*H04N 25/65* (2023.01)

(52) U.S. Cl.

CPC ........... *H04N 25/771* (2023.01); *H04N 25/53* (2023.01); *H04N 25/62* (2023.01); *H04N 25/65* (2023.01)

(58) Field of Classification Search

CPC ...... H04N 25/771; H04N 25/53; H04N 25/62; H04N 25/65; H04N 25/616; H04N 25/77; H04N 25/78
USPC .......................................................... 348/297
See application file for complete search history.

(56) References Cited

U.S. PATENT DOCUMENTS 11,047,808 B2 * 6/2021 Iwashita ................ A61B 6/542
11,206,367 B1 * 12/2021 Shim .................... H04N 25/532
2002/0190215 A1 * 12/2002 Tashiro .................. H04N 25/59 348/E5.088
2005/0190215 A1 * 9/2005 Morikoshi ........... B41J 2/17513 347/6
2006/0077273 A1 * 4/2006 Lee ...................... H04N 25/616 348/308
2009/0101798 A1 * 4/2009 Yadid-Pecht ........ H04N 25/531 250/214 A
2018/0328862 A1 * 11/2018 Sato ........................ G01T 1/247
2019/0250284 A1 * 8/2019 Naito ........................ G01T 1/17
2021/0084243 A1 3/2021 Ni
2021/0400214 A1 * 12/2021 Shim ...................... H04N 25/77
2025/0024166 A1 * 1/2025 Watanabe ............ H04N 25/772

* cited by examiner

*Primary Examiner* — Lin Ye
*Assistant Examiner* — Chan T Nguyen
(74) *Attorney, Agent, or Firm* — Christensen O'Connor Johnson Kindness PLLC

(57) ABSTRACT

An image sensor is an image sensor including a plurality of pixels. Each of the pixels includes a photodiode configured to generate charges based on a light incident amount, a reset transistor configured to reset the photodiode by supplying a reset voltage to the photodiode, a first capacitor configured to hold an output voltage of the photodiode immediately after the reset, and a second capacitor configured to hold the output voltage of the photodiode after a predetermined exposure period. An image signal is obtained from the voltage held by the first capacitor and the voltage held by the second capacitor.

38 Claims, 30 Drawing Sheets

PHOTO VOLTAIC IMAGE SENSOR

TECHNICAL FIELD

The present disclosure generally relates to an image sensor using a photodiode.

BACKGROUND INFORMATION

An image sensor includes a photodiode in each of pixel circuits, and detects a charge amount generated based on light entering each of the photodiodes.

FIG. 1 is a diagram illustrating VI characteristics of one photodiode. As illustrated, the VI characteristics of the photodiode have a logarithmic region (at high illuminance) where the photodiode operates with a forward bias, and a linear region (at low illuminance) where the photodiode operates with a reverse bias and a part of the forward bias.

In the linear region where the photodiode operates under low luminance, thermal noise called kTC noise occurs. The kTC noise is noise caused by switching of a reset transistor resetting accumulated charges of the photodiode.

FIG. 2 is a diagram illustrating the kTC noise. As illustrated, after reset, offset shift appears in an output voltage Vpd of the photodiode. A direction of the shift is not fixed. Accordingly, the kTC noise deteriorates quality of a reproduced image.

The kTC noise is desirably removed from an output of the image sensor.

An example has disclosed integration of the output of the photodiode in order to remove flicker caused by LED lighting.

SUMMARY

An image sensor according to the present disclosure is an image sensor including a plurality of pixels. Each of the pixels includes a photodiode configured to generate charges based on a light incident amount, a reset transistor configured to reset the photodiode by supplying a reset voltage to the photodiode, a first capacitor configured to hold an output voltage of the photodiode immediately after the reset, and a second capacitor configured to hold the output voltage of the photodiode after a predetermined exposure period. An image signal is obtained from the voltage held by the first capacitor and the voltage held by the second capacitor.

BRIEF DESCRIPTION OF THE DRAWINGS

Embodiment(s) of the present disclosure will be described based on the following figures, wherein.

DETAILED DESCRIPTION

An embodiment of the present disclosure is described below with reference to drawings. The following embodiment does not limit the present disclosure, and configurations obtained by selectively combining a plurality of illustrations are also included in the present disclosure.

Circuit Configuration

Figure 1:
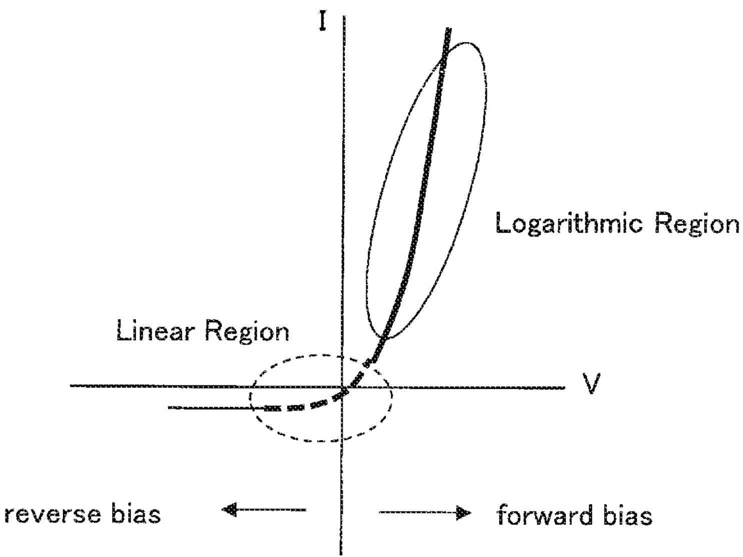
FIG. 1 is a diagram illustrating VI characteristics of a common photodiode.
Figure 2:
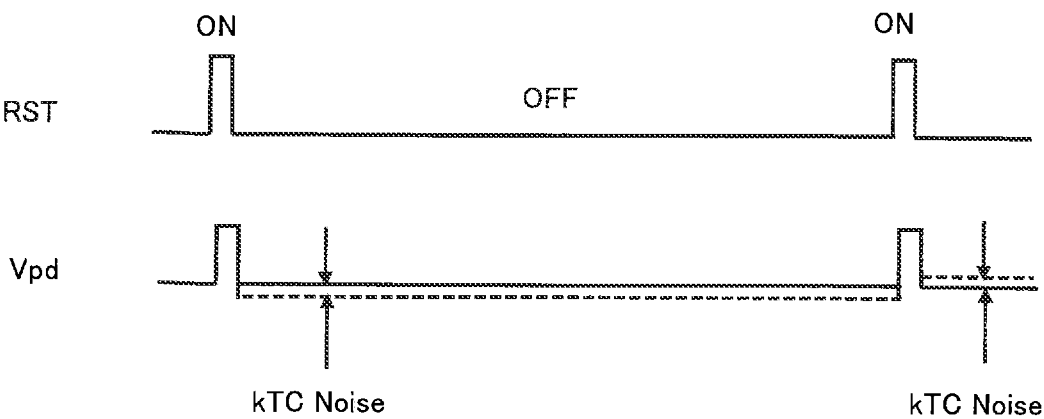
FIG. 2 is a diagram illustrating kTC noise.
Figure 3:
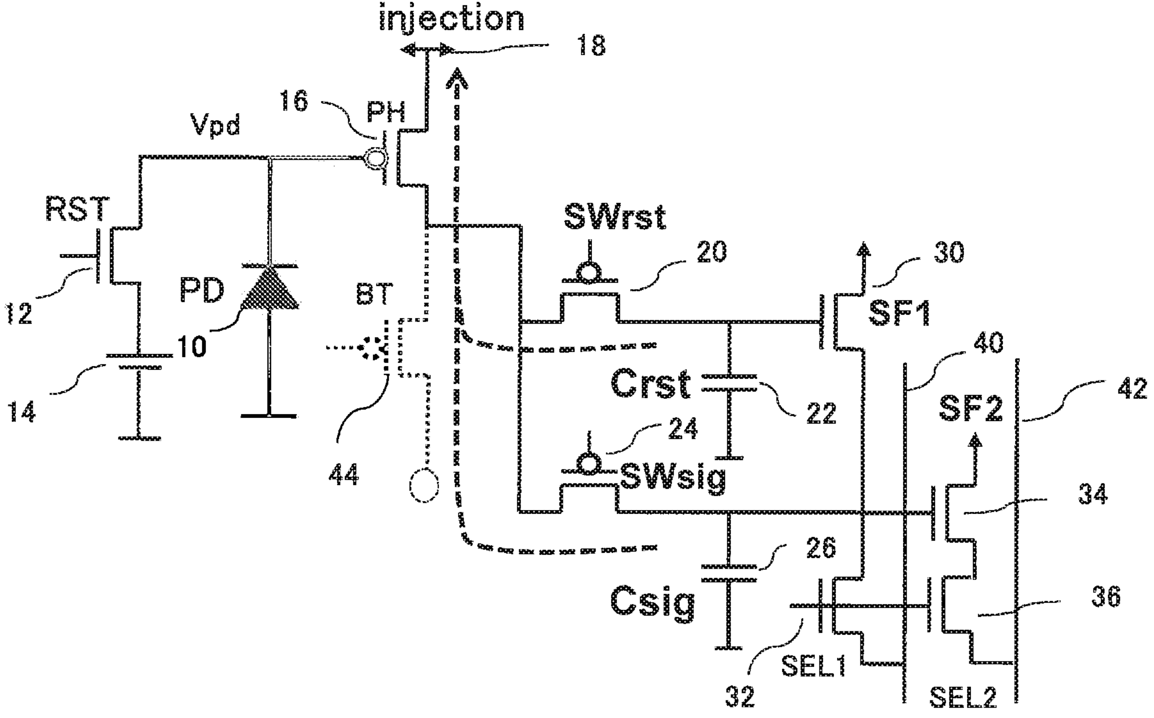
FIG. 3 is a diagram illustrating a configuration of a pixel circuit.

FIG. 3 is a diagram illustrating a configuration of a pixel circuit. A photodiode (PD) 10 accumulates charges (electrons in this case) based on incident light. A cathode of the photodiode (PD) 10 serves as an output end, and an anode is connected to a power supply (e.g., ground). In the present embodiment, a field-effect transistor (FET) is used as a transistor.

One end (drain) of a reset transistor (RST) 12 is connected to the cathode of the photodiode (PD) 10, and the other end (source) of the reset transistor (RST) 12 is connected to a power supply (e.g., ground) through a reset power supply 14. In this example, the reset transistor (RST) 12 is an n-channel transistor.

The cathode of the photodiode (PD) 10 is connected to a gate of a peak hold (PH) transistor 16. The peak hold transistor 16 is a p-channel transistor. A source of the peak hold transistor 16 is connected to an injection power supply 18. A source of a first switch transistor (SWrst) 20 and a source of a second switch transistor (SWsig) 24 are connected to a drain of the peak hold transistor 16. One end of a first capacitor (Crst) 22 is connected to a drain of the first switch transistor (SWrst) 20. One end of a second capacitor (Csig) 26 is connected to a drain of the second switch transistor (SWsig) 24. The other end of the first capacitor (Crst) 22 and the other end of the second capacitor (Csig) 26 are each connected to a power supply (e.g., ground). The first switch transistor (SWrst) 20 and the second switch transistor (SWsig) 24 are p-channel transistors.

The drain of the first switch transistor (SWrst) 20 is connected to a gate of a first source follower transistor (SF1) 30. A drain of the first source follower transistor (SF1) 30 is connected to a power supply, and a source is connected to a drain of a first selection transistor (SEL1) 32. A source of the first selection transistor (SEL1) is connected to a first output line 40.

The drain of the second switch transistor (SWsig) 24 is connected to a gate of a second source follower transistor (SF2) 34. A drain of the second source follower transistor (SF2) 34 is connected to a power supply, and a source is connected to a drain of a second selection transistor (SEL2) 36. A source of the second selection transistor (SEL1) 36 is connected to a second output line 42.

A gate of the first selection transistor (SEL1) 32 and a gate of the second selection transistor (SEL2) 36 are connected in common, and are supplied with a row selection signal. When the row selection signal becomes an H level, a signal corresponding to a gate voltage of the first source follower transistor (SF1) 30 is output to the first output line 40, and a signal corresponding to a gate voltage of the second source follower transistor (SF2) 34 is output to the second output line 42.

The source follower transistors (SF1 and SF2) 30 and 34 and the selection transistors (SEL1 and SEL2) 32 and 36 are n-channel transistors. Note that the source follower transistors (SF) are referred to as output transistors, the first source follower transistor (SF1) 30 is referred to as a first output transistor, the second source follower transistor (SF2) 34 is referred to as a second output transistor, and the gates thereof are referred to as control ends.

As described above, the pixel circuit includes the two switch transistors (SWrst and SWsig) 20 and 24 and the two capacitors (Crst and Csig) 22 and 26. The first capacitor (Crst) 22 accumulates only the kTC noise immediately after reset, and the second capacitor (Csig) 26 accumulates a voltage signal and the kTC noise (S+N) of one frame period. Further, noise (N) is output from the first capacitor (Crst) 22 to the first output line 40, and the voltage signal+noise (S+N) is output from the second capacitor (Csig) 26 to the second output line 42. These two output signals are supplied to an external circuit, and the external circuit performs subtraction to remove the kTC noise from the output signal of the second capacitor (Csig) 26 (S+N−N=S).

Figure 4:
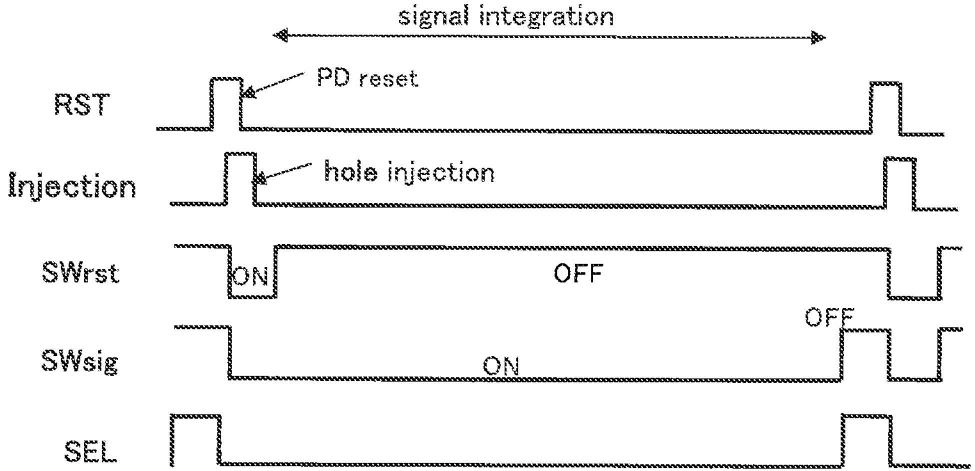
FIG. 4 is a timing chart illustrating operation of the circuit in FIG. 3.

FIG. 4 is a timing chart illustrating operation of the circuit according to the present embodiment illustrated in FIG. 3. The reset transistor (RST) 12 is turned on to reset the photodiode (PD) 10. Further, an injection voltage is output (is set to H level) from the injection power supply 18 while the first switch transistor (SWrst) 20 and the second switch transistor (SWsig) 24 are turned on, to inject holes into the first capacitor (Crst) 22 and the second capacitor (Csig) 26 through the peak hold transistor (PH) 16.

Next, the injection power supply 18 is returned to an L level to stop injection of the holes. At this time, excess injected holes are discharged through the peak hold transistor (PH) 16 by keeping the first and second switch transistors (SWrst and SWsig) 20 and 24 on.

Next, the first switch transistor (SWrst) is turned off to cause the first capacitor (Crst) 22 to hold the voltage immediately after reset, namely, the noise (N) not including the image signal. After a signal integration period (exposure period) passes, the second switch transistor (SWsig) 24 is turned off to end accumulation of the signal, and the second capacitor (Csig) 26 is caused to hold the image signal+noise (S+N).

Next, the first and second selection transistors (SEL1 and SEL2) 32 and 36 are turned on to output the noise (N) accumulated in the first capacitor (Crst) 22 and the image signal+noise (S+N) accumulated in the second capacitor (Csig) 26 to the output lines 40 and 42 through the source follower transistors (SF1 and SF2) 30 and 34, respectively.

Since the noise (N) and the image signal+noise (S+N) are transferred to the output lines 40 and 42 in the above-described manner, the image signal from which the noise is removed is obtained by performing subtraction in a readout circuit (S+N−N=S).

The injection of the holes may be performed while the reset transistor (RST) 12 is turned on or after the reset transistor (RST) 12 is turned off. Further, a bias transistor 44 illustrated by a dashed line in the drawing may be provided, the holes may be injected from the source of the bias transistor 44 by switching the gate ON, and excess holes may be discharged through the peak hold transistor (PH) 16.

Configuration of Image Sensor

Figure 5:
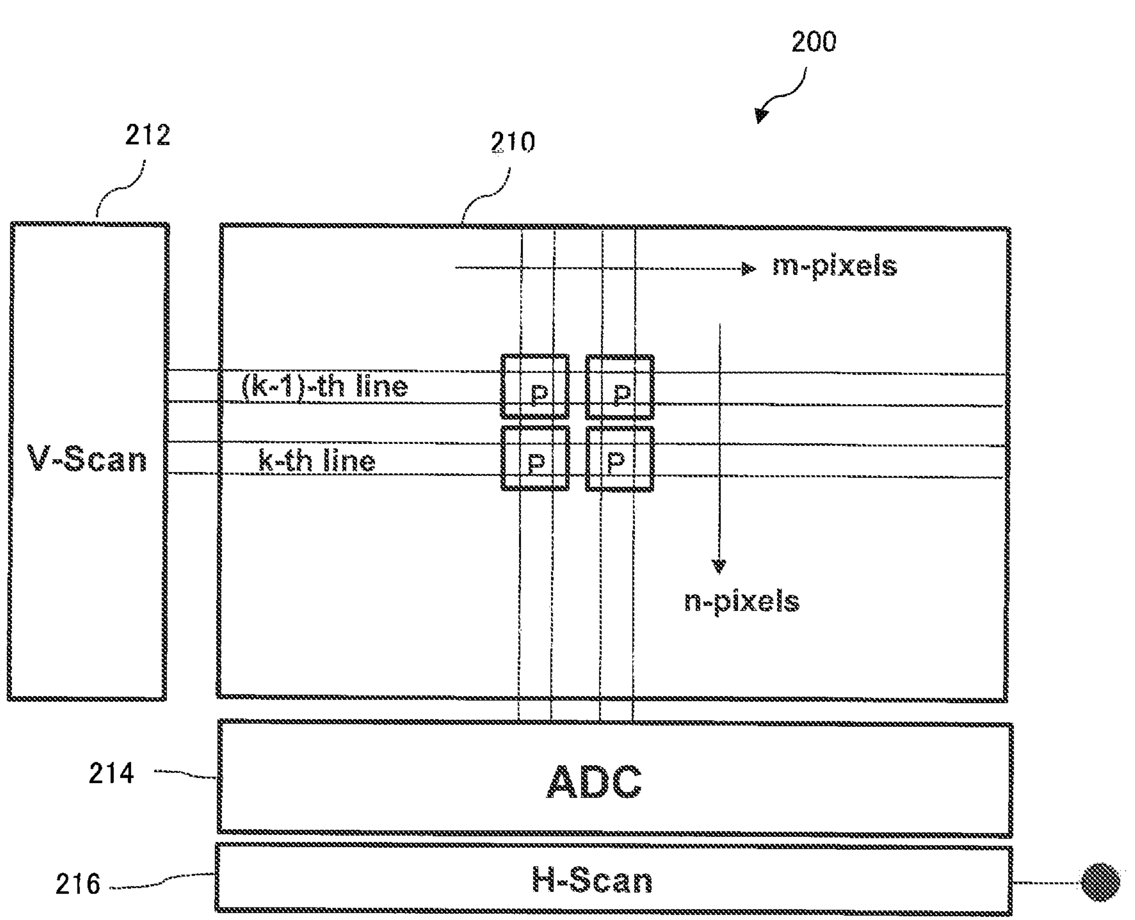
FIG. 5 is a diagram illustrating an image sensor 200 in which the above-described pixels are two-dimensionally arranged.

FIG. 5 is a diagram illustrating an image sensor 200 in which the pixels according to the embodiment are two-dimensionally arranged. A pixel array 210 includes pixels P as described above arranged in m columns*n rows (m*n), namely, includes m pixels in a horizontal direction and n pixels in a vertical direction. A vertical scan circuit (V-Scan) 212 sequentially selects rows of the pixels P in the vertical direction. The pixels in each column are connected to an analog-to-digital converter (ADC) 214 by a readout line in the vertical direction. A horizontal scan circuit (H-Scan) 216 is connected to the analog-to-digital converter (ADC) 214, and image signals of the respective pixels are sequentially output from the horizontal scan circuit (H-Scan) 216.

Figure 6:
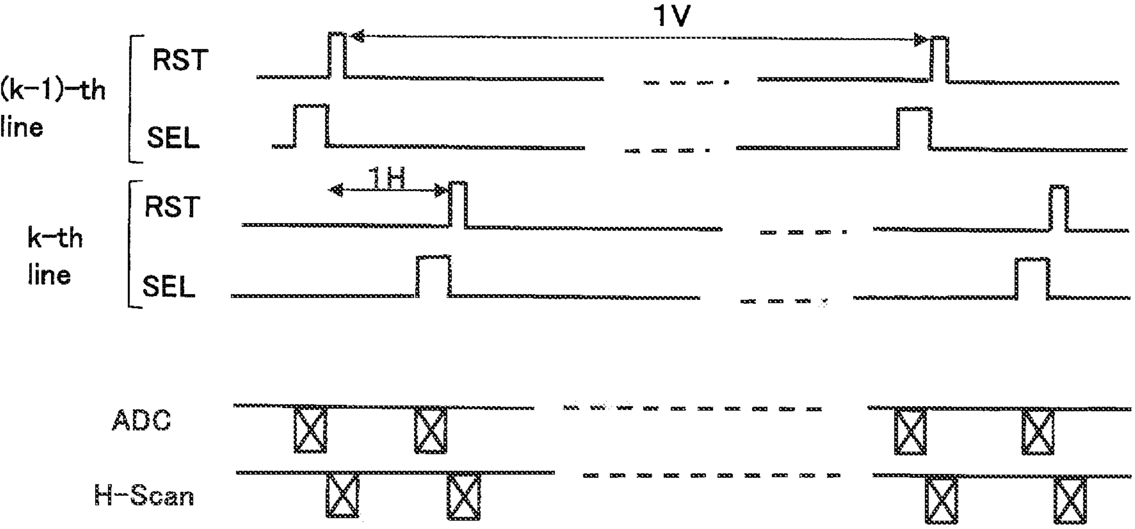
FIG. 6 is a timing chart illustrating operation timings of the image sensor 200.

FIG. 6 is a timing chart illustrating operation of the image sensor 200. Here, the injection pules in FIG. 4 are omitted.

In a (k−1)-th row, the reset transistor (RST) 12 is turned on to reset the photodiode (PD) 10. The reset is performed for each vertical period (1V). Further, exposure starts after one reset. In addition, the signals are read out shortly before next reset. As described above, the two selection transistors (SEL1 and SEL2) are turned on, and the noise (N) and the image signal+noise (S+N) described above are respectively read out to the output lines 40 and 42. The read signals are supplied to the analog-to-digital converter (ADC) 214, and are converted into digital signals. The operation is simultaneously performed on the m pixels in one horizontal line. Thereafter, the horizontal scan circuit (H-scan) 216 sequentially outputs the digital signals of the m pixels.

Next, the same operation is performed on a k-th row by shifting the horizontal period by 1H. Signals of all of the m*n pixels can be read out by repeating the operation n times.

As described above, the two signals of the signal (N) about the noise and the signal+noise (S+N) are read out from each pixel circuit. The ADC 214 can perform calculation to subtract the noise (N) from the image signal+noise (S+N). Alternatively, the two signals may be output to outside from the image sensor 200, and an external circuit may remove the noise from the image signal+noise (S+N).

Modification 1

Figure 7:
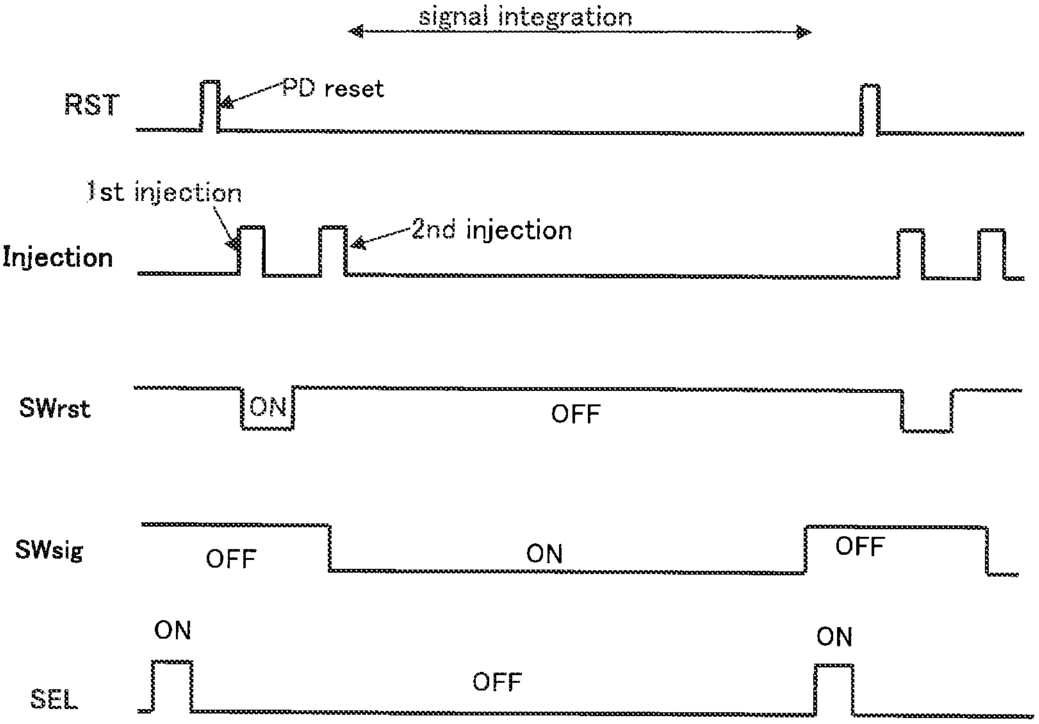
FIG. 7 is a timing chart illustrating operation according to a modification 1.

FIG. 7 is another timing chart illustrating operation of the circuit according to the embodiment illustrated in FIG. 3. The reset transistor (RST) 12 is turned on to reset the photodiode (PD) 10.

After the first switch transistor (SWrst) 20 is turned on, the injection power supply 18 is turned on (outputs injection voltage) for a short period. As a result, the holes are injected into the first capacitor (Crst) 22, and excess holes are discharged. Thereafter, the first switch transistor (SWrst) is turned off to cause the first capacitor (Crst) to hold the noise.

Next, to be different from what is shown in the timing chart of FIG. 4 where both SWrst 20 and SWsig 24 are turned on at the same time to accept the hole injection through PH transistor 16, after the second switch transistor (SWsig) 24 is turned on, the injection power supply 18 is turned on a second time for a short period while SWrst remains off. As a result, the holes are injected into the second capacitor (Csig) 26, and excess holes are discharged. Thereafter, the image signal+noise (S+N) is accumulated in the second capacitor (Csig) 26.

When the second switch transistor (SWsig) 24 is turned off, accumulation of the image signal+noise (S+N) is completed. Thereafter, the noise (N) and the image signal+noise (S+N) are separately read out from the two capacitors (Crst and Csig) 22 and 26.

Modification 2

Figure 8:
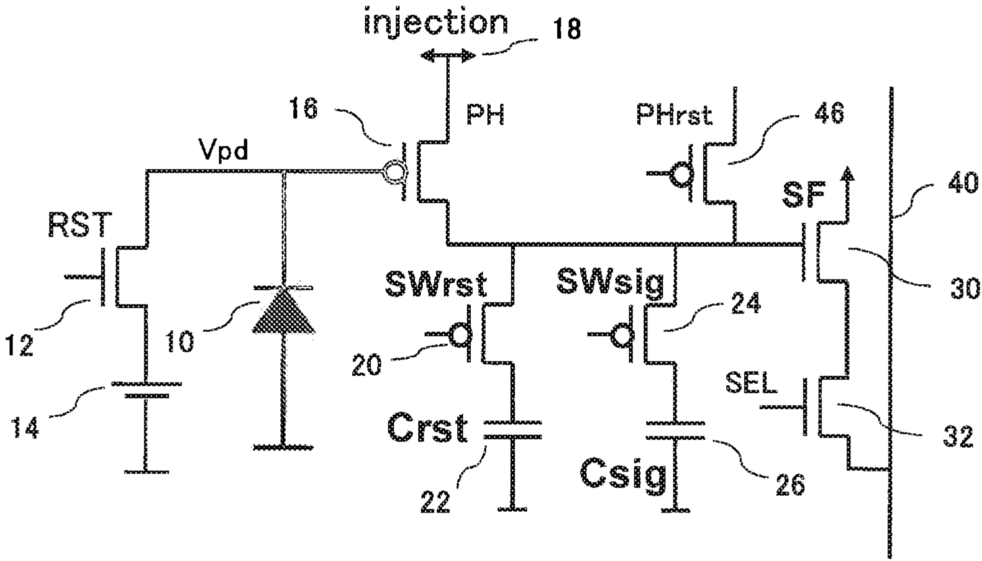
FIG. 8 is a diagram illustrating a circuit configuration according to a modification 2.

FIG. 8 is a diagram illustrating a circuit configuration according to a modification 2. In the modification 2, one source follower circuit (source follower transistor (SF) 30 and selection transistor (SEL) 32) is used to read out the signals (N and S+N) of the two capacitors (Crst and Csig) 22 and 26.

The source follower transistor (SF) 30 is connected to the drain of the peak hold transistor (PH) 16, and the sources of the first switch transistor (SWrst) 20 and the second switch transistor (SWsig) 24 are also connected to the drain of the peak hold transistor (PH) 16. The drain of the first switch transistor (SWrst) 20 is connected to a power supply (e.g., ground) through the first capacitor (Crst) 22, and the drain of the second switch transistor (SWsig) 24 is connected to a power supply (e.g., ground) through the second capacitor (Csig) 26.

Further, a PH reset transistor (PHrst) 46 is connected to the drain of the peak hold transistor (PH) 16. When the PH reset transistor (PHrst) 46 is turned on, the gate of the source follower transistor (SF) 30 can be reset by a PH reset voltage.

Figure 9:
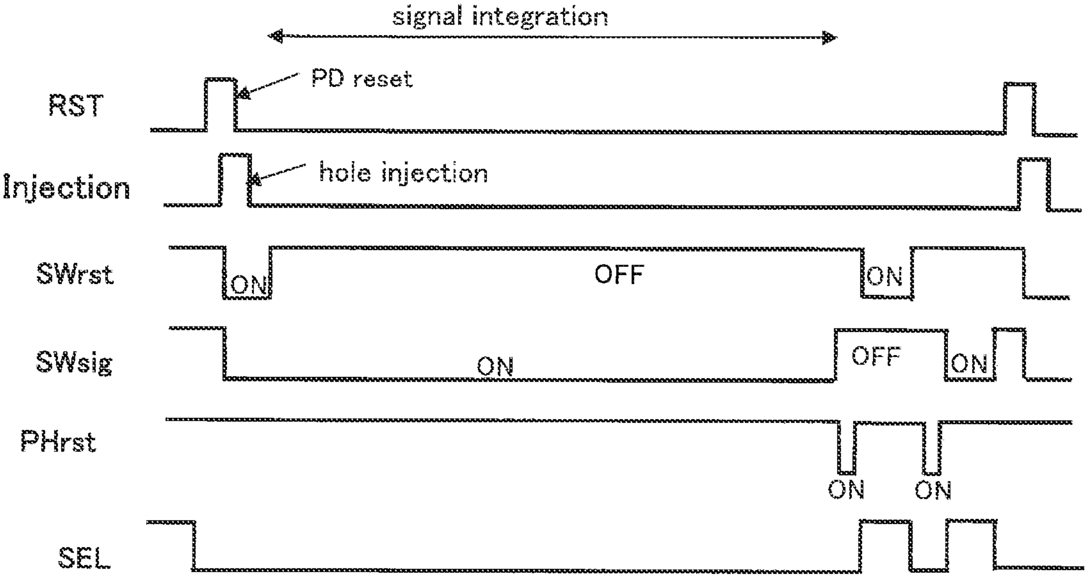
FIG. 9 is a timing chart illustrating operation according to the modification 2.

FIG. 9 is a timing chart illustrating operation according to the modification 2. After the reset transistor (RST) 12 is turned on to reset the photodiode (PD) 10, the switch transistors (SWrst and SWsig) 20 and 24 are turned on, and the injection power supply 18 is turned on for a short period. As a result, the holes are injected into the two capacitors (Crst and Csig) 22 and 26 through the peak hold transistor (PH) 16, and excess holes are removed by leakage of the peak hold transistor (PH) 16.

Next, the first switch transistor (SWrst) 20 is turned off to cause the first capacitor (Crst) 22 to hold the noise (N).

After the signal integration time ends, the second switch transistor (SWsig) is turned off to cause the second capacitor (Csig) to hold the image signal+noise (S+N).

After the PH reset transistor (PHrst) 46 is turned on to reset the gate of the source follower transistor (SF) 30, the PH reset transistor (PHrst) 46 is turned off, and the first switch transistor (SWrst) is turned on. In this state, the selection transistor (SEL) 32 is turned on, to read out the noise to the output line 40.

Thereafter, after the PH reset transistor (PHrst) is turned on for a short period, to reset the gate of the source follower transistor (SF) 30, the second switch transistor (SWsig) and the selection transistor (SEL) 32 are turned on to read out the image signal+noise (S+N).

As described above, the noise (N) and the image signal+noise (S+N) can be read out to the corresponding output line 40 through one source follower transistor (SF) 30.

Modification 3

Figure 10:
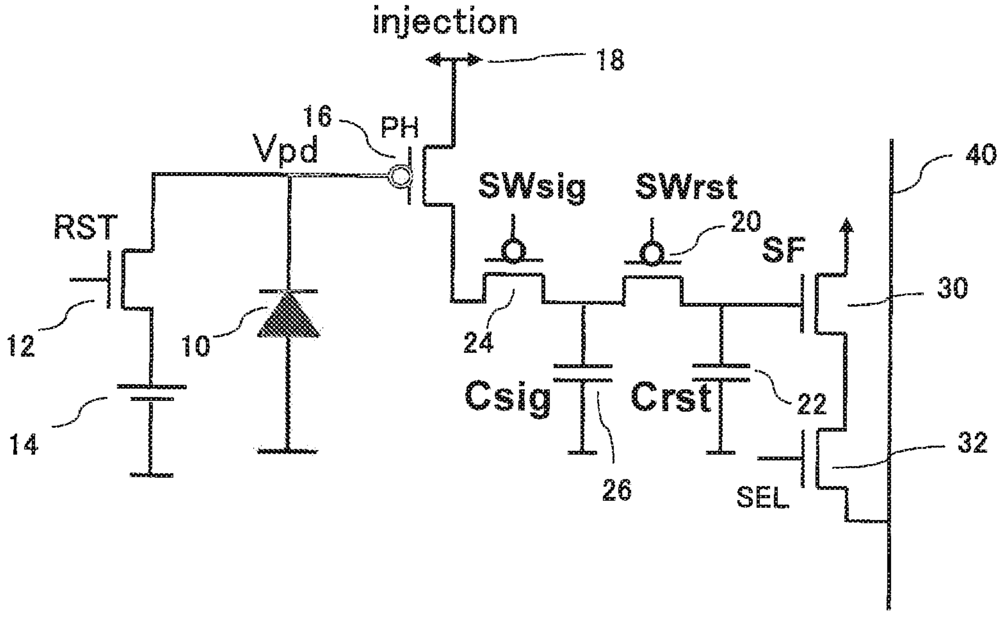
FIG. 10 is a diagram illustrating a configuration according to a modification 3.

FIG. 10 is a diagram illustrating a configuration according to a modification 3. In the configuration according to the modification 3, the noise and the signal+noise are read out from one source follower transistor (SF) 30 as in the modification 2, but a method of connecting the two switch transistors (SWrst and SWsig) is different from the configuration according to the modification 2.

The source of the second switch transistor (SWsig) 24 is connected to the drain of the peak hold transistor (PH) 16, and the second capacitor (Csig) 26 and the source of the first switch transistor (SWrst) 20 are connected to the drain of the second switch transistor (SWsig) 24. Further, the first capacitor (Crst) 22 and the gate of the source follower transistor (SF) are connected to the drain of the first switch transistor (SWrst) 20.

In other words, the two switch transistors (SWrst and SWsig) are connected in series.

Figure 11:
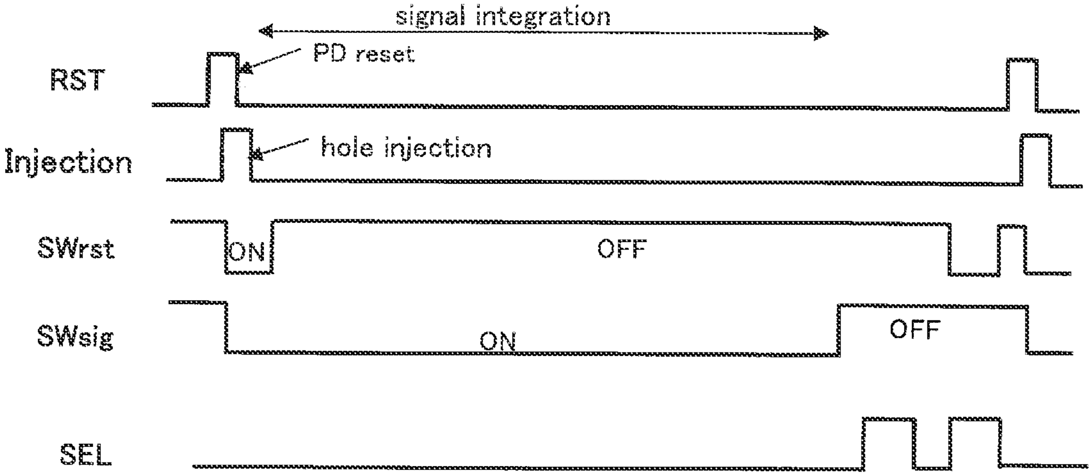
FIG. 11 is a timing chart illustrating operation according to the modification 3.

FIG. 11 is a timing chart illustrating operation of the circuit in FIG. 10.

After the reset transistor (RST) 12 is turned on to reset the photodiode (PD) 10, the switch transistors (SWrst and SWsig) 20 and 24 are turned on, and the injection power supply 18 is turned on for a short period. As a result, the holes are injected into the two capacitors (Crst and Csig) 22 and 26 through the peak hold transistor (PH) 16, and excess holes are removed through leakage of the peak hold transistor (PH) 16.

Next, the first switch transistor (SWrst) 20 is turned off to cause the first capacitor (Crst) 22 to hold the noise (N).

After the signal integration period ends, the second switch transistor (SWsig) is turned off to cause the second capacitor (Csig) to hold the image signal+noise (S+N).

In this state, the selection transistor (SEL) 32 is turned on to read out the noise (N) held in the first capacitor (Crst) 22 to the output line 40. In other words, the noise (N) accumulated in the first capacitor (Crst) is read out to the output line 40 through the source follower transistor (SF) 30 and the selection transistor (SEL) 32. At this time, since the first switch transistor (SWrst) 20 is turned off, the first capacitor (Crst) 22 still holds the image signal(S)+noise (N).

Next, the first switch transistor (SWrst) 20 is turned on. As a result, the first capacitor (Crst) 22 and the second capacitor (Csig) 26 are connected in parallel. In this state, the selection transistor (SEL) 32 is turned on to read out the signal of the gate potential of the source follower transistor (SF) 30.

In this case, an output voltage of the parallel connection of the two capacitors (Crst and Csig) 22 and 26 is a value obtained by dividing a sum of charges held in the two capacitors (Crst and Csig) by a sum of capacitances of the two capacitors (Crst and Csig).

When Crst=Csig is assumed, the noise voltage is denoted by N, and the signal voltage is denoted by S, the voltage of the gate of the source follower transistor (SF) can be expressed as follows, $$N/2+(S+N)/2=S/2+N.$$

The signal S/2 is obtained by subtracting a signal N read out for a first time from a signal S/2+N read out for a second time. Accordingly, the image signal S can be obtained by doubling the signal S/2.

Modification 4

Figure 12:
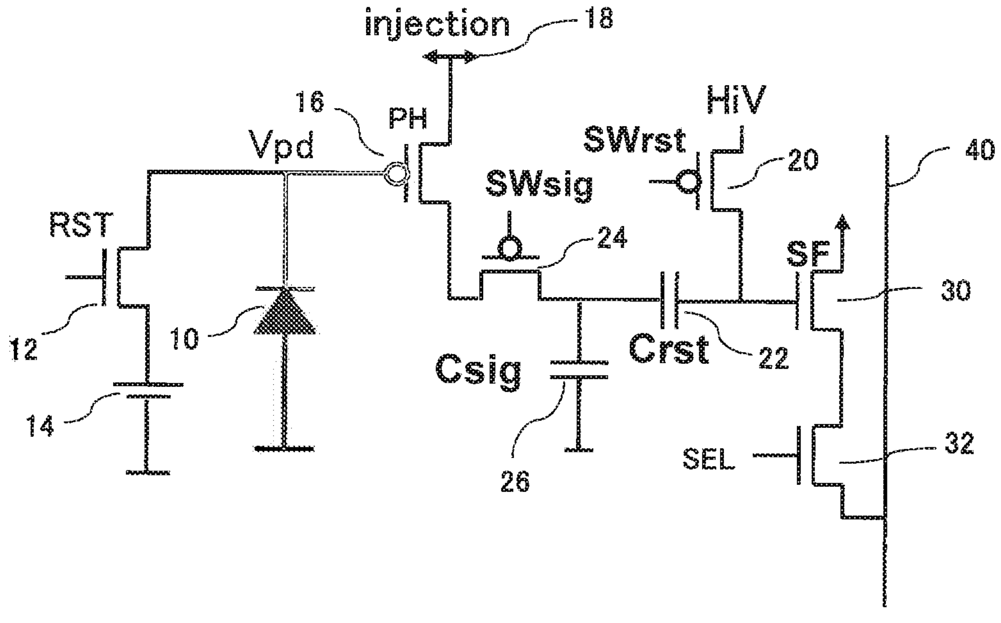
FIG. 12 is a diagram illustrating a configuration according to a modification 4.

FIG. 12 is a diagram illustrating a configuration according to a modification 4. In the configuration according to the modification 4, the noise (N) is subtracted from the image signal+noise (S+N) in the pixel.

The source of the second switch transistor (SWsig) 24 is connected to the drain of the peak hold transistor (PH) 16, and the second capacitor (Csig) 26 is connected to the drain of the second switch transistor (SWsig) 24. The drain of the second switch transistor (SWsig) 24 is connected to the gate of the source follower transistor (SF) 30 through the first capacitor (Crst) 22. Further, the drain of the first switch transistor (SWrst) is connected to a connection point of the first capacitor (Crst) 22 and the gate of the source follower transistor (SF) 30, and the source of the first switch transistor (SWrst) is connected to a power supply HiV. The power supply HiV outputs a predetermined voltage to cause the first capacitor to hold a voltage (negative direction) corresponding to the kTC noise. In other words, the predetermined voltage output from the power supply HiV is a voltage equivalent to the voltage held in the second capacitor (Csig) 26 after injection.

Figure 13:
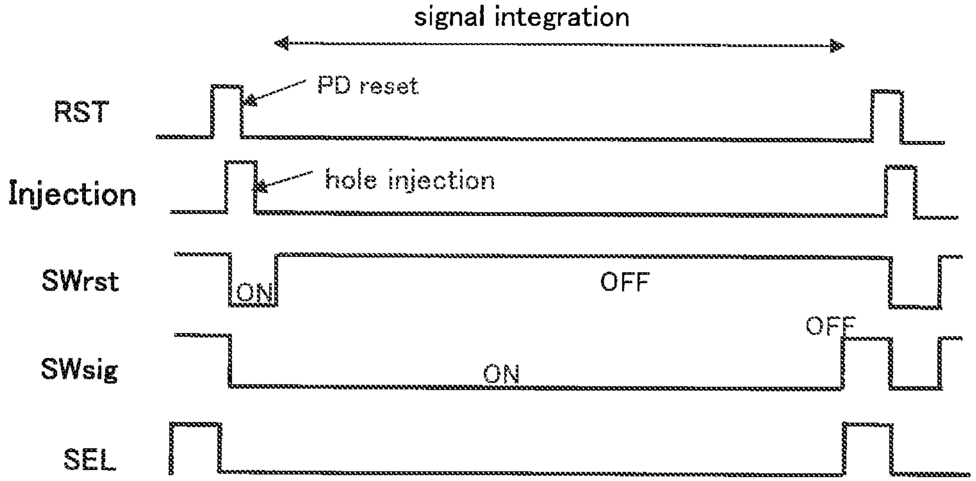
FIG. 13 is a timing chart illustrating operation according to the modification 4.

FIG. 13 is a timing chart illustrating operation of the circuit in FIG. 12.

After the reset transistor (RST) 12 is turned on to reset the photodiode (PD) 10, the switch transistors (SWrst and SWsig) 20 and 24 are turned on. In this state, the injection power supply 18 is turned on for a short period. The holes are injected into the second capacitor (Csig) 26 and the first capacitor (Crst) 22 through the peak hold transistor (PH) 16. Further, excess holes are removed through leakage of the peak hold transistor (PH) 16.

Thereafter, when the first switch transistor (SWrst) 20 is turned off, the voltage after the injection power supply 18 is turned off, namely, the noise (N) is held in the first capacitor (Crst) 22. At this time, the noise (N) on the second switch transistor (SWsig) side is negative.

After the signal integration time ends, the second switch transistor (SWsig) 24 is turned off, and the image signal+noise (S+N) is held in the second capacitor (Csig) 26.

At this time, the first capacitor (Crst) 22 previously holds the signal-N corresponding to the negative noise. Therefore, only the image signal S not including the noise appears at the gate of the source follower transistor (SF) 30 because of S+N−N, and is read out to the output line 40.

Modification 5

Figure 14:
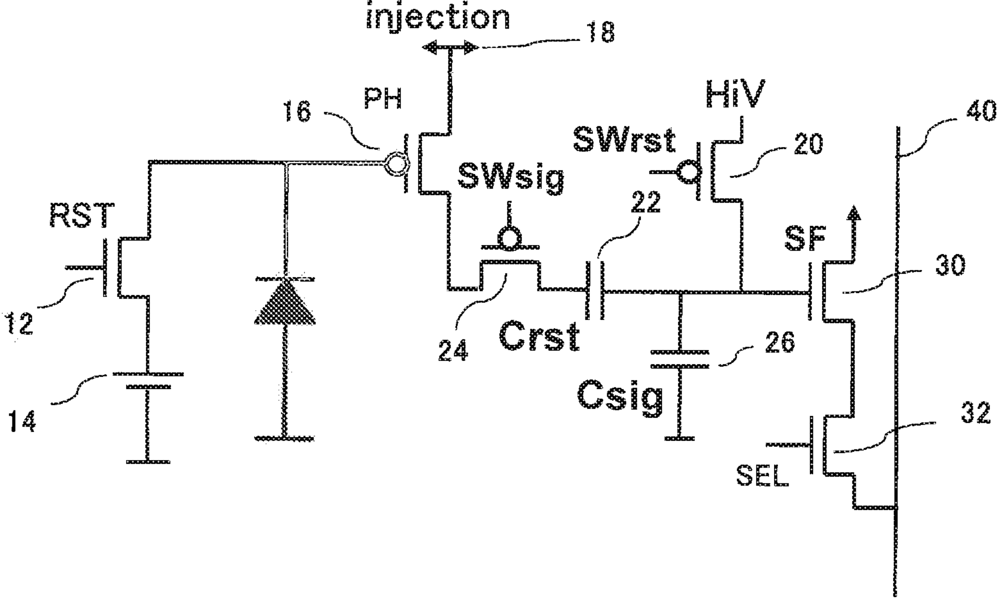
FIG. 14 is a diagram illustrating a configuration according to a modification 5.

FIG. 14 is a diagram illustrating a configuration according to a modification 5. In the modification 5, the position of the first capacitor (Crst) 22 is different from the position of the first capacitor (Crst) 22 according to the modification 4.

The source of the second switch transistor (SWsig) 24 is connected to the drain of the peak hold transistor (PH) 16, and the drain of the second switch transistor (SWsig) 24 is connected to the gate of the source follower transistor (SF) 30 through the first capacitor (Crst) 22. The drain of the first switch transistor (SWrst) 20 is connected to a connection point of the first capacitor (Crst) 22 and the gate of the source follower transistor (SF) 30. The source of the first switch transistor (SWrst) 20 is connected to the power supply HiV.

One end of the second capacitor (Csig) 26 is connected to the connection point of the first capacitor (Crst) 22 and the gate of the source follower transistor (SF) 30. The other end of the second capacitor is connected to a predetermined power supply.

Figure 15:
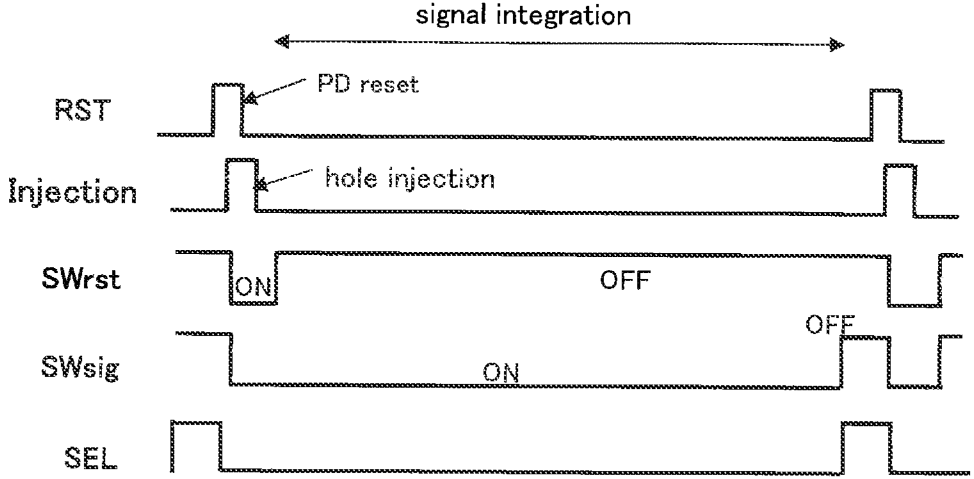
FIG. 15 is a timing chart illustrating operation according to the modification 5.

FIG. 15 is a timing chart illustrating operation of the circuit in FIG. 14. After the reset transistor (RST) 12 is turned on to reset the photodiode (PD) 10, the switch transistors (SWrst and SWsig) 20 and 24 are turned on. In this state, the injection power supply 18 is turned on for a short period. Here, Crst>>Csig is assumed. Thereafter, when the first switch transistor (SWrst) 20 is turned off, the voltage corresponding to the noise after the injection power supply 18 is turned off is held in the first capacitor (Crst) 22. The voltage corresponding to the noise on the second switch transistor (SWsig) side is negative as in the modification 4.

During the signal integration period, the accumulated charges of the first capacitor (Crst) 22 are not changed. Therefore, potentials on both sides of the first capacitor (Crst) are changed together. After the signal integration period ends, the second switch transistor (SWsig) 24 is turned off, and the signal+noise is held in the second capacitor (Csig).

At this time, the first capacitor (Crst) 22 previously holds the signal-N corresponding to the negative noise. Therefore, the signal at the gate of the source follower transistor (SF) 30 is S+N−N. In other words, the voltage of the second capacitor (Csig) 26 is a voltage corresponding to the signal-N at start of the signal integration, and becomes a voltage corresponding to the image signal S at end of the signal integration.

If Crst=Csig, the first capacitor (Crst) 22 previously holds the signal −N/2 and the signal at the gate of the source follower transistor (SF) 30 is (S+N)/2−N/2.

Global Integration

Figure 16:
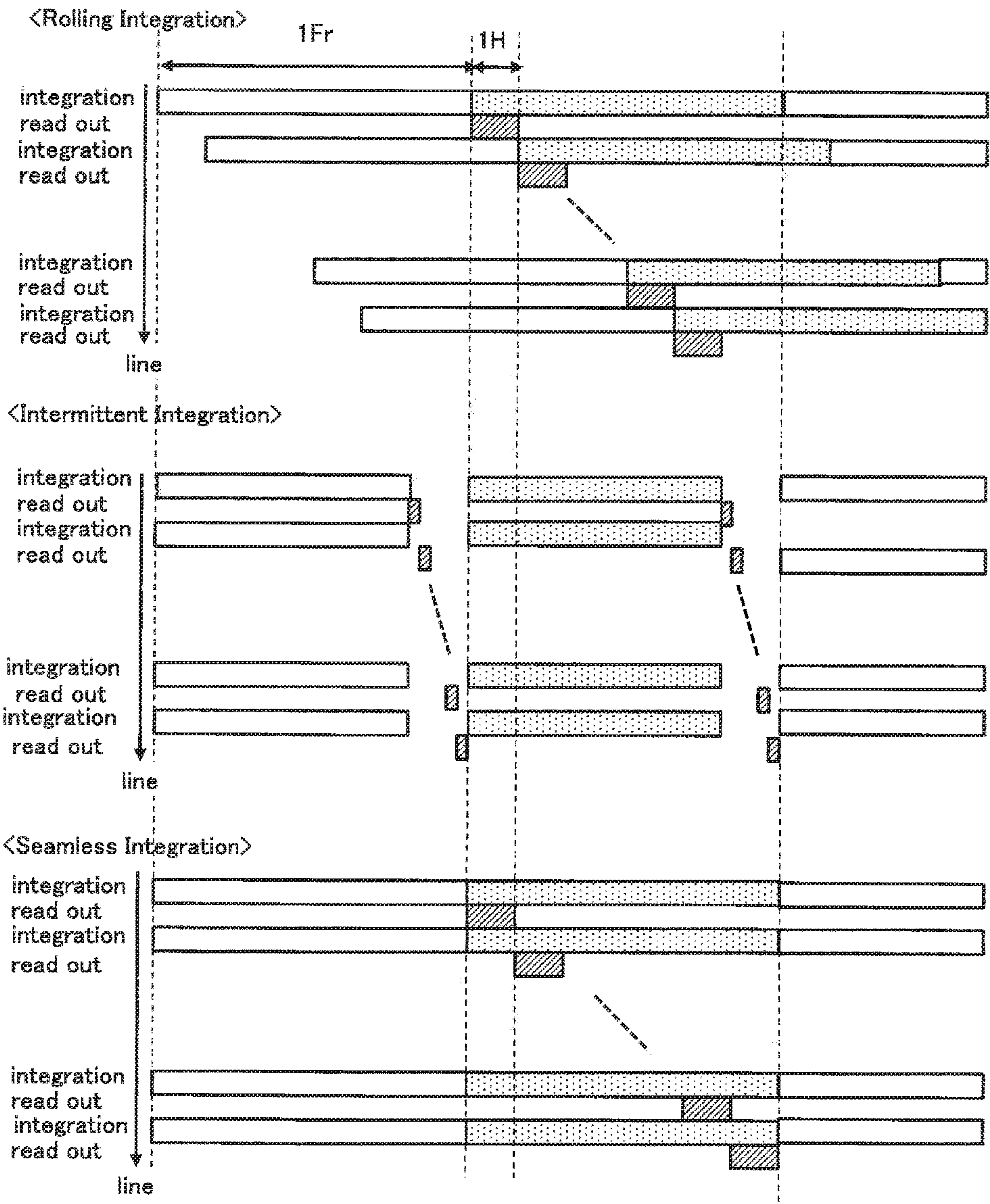
FIG. 16 is a diagram illustrating three signal readout methods of an image sensor.

FIG. 16 is a diagram illustrating three signal readout methods of an image sensor.

1. Rolling Integration

An upper part of FIG. 16 is a timing chart of rolling integration. As illustrated, the signals are accumulated in the pixels of one row (one horizontal line) during one frame period. The accumulated signals are read out during a period 1H at the beginning of a signal integration period in next one frame period. The integration periods of the respective rows are sequentially shifted by the period 1H. As a result, the signals of the respective rows are sequentially read out row by row during one frame period.

In the rolling integration, the integration periods of the signals of the respective rows are sequentially shifted by the period 1H. Therefore, in a case where the image sensor is mounted on a mobile body such as a vehicle, a reproduced image is easily distorted because an object is moved.

2. Intermittent Integration

A middle part is a timing chart of intermittent integration. As illustrated, the signal integration period is the same among the pixels of all rows. Therefore, the intermittent integration is a type of global integration. The signal integration period of one frame is shorter than one frame period, and the signals of all rows are sequentially read out row by row during a period when the signal integration is not performed.

3. Seamless Integration

A lower part is a timing chart of seamless integration. As illustrated, the signal integration period is the same among the pixels of all rows. Therefore, the seamless integration is a type of the global integration. The signal integration period corresponds to one frame period, and the signals of all rows are sequentially read out row by row during a period when signal integration of next frame is performed.

Pixel Circuit of Intermittent Integration

Figure 17:
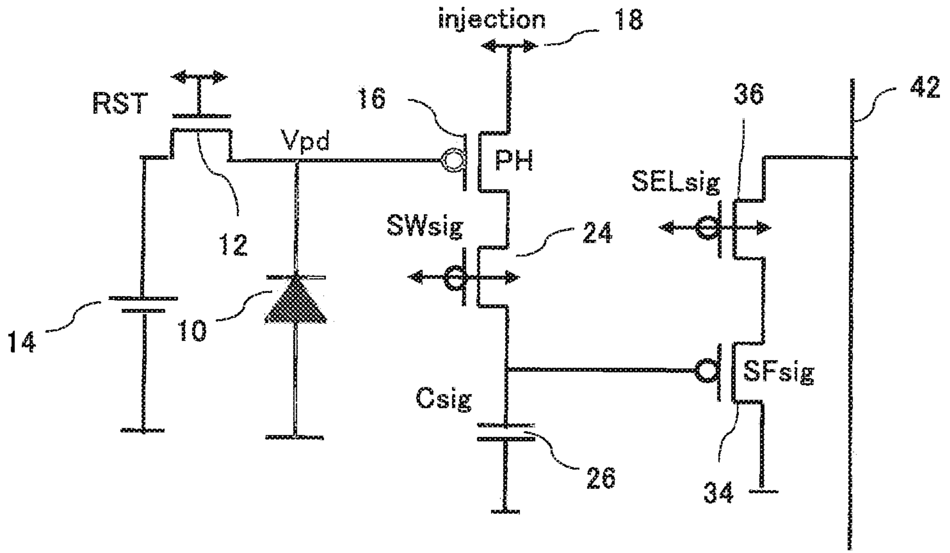
FIG. 17 is a diagram illustrating a configuration of a pixel circuit performing intermittent integration.

FIG. 17 is a diagram illustrating a configuration of a pixel circuit performing the intermittent integration. The cathode of the photodiode (PD) 10 is connected to the gate of the peak hold transistor (PH) 16. The gate of the peak hold transistor (PH) 16 connected to the reset power supply through the reset transistor (RST) 12. The drain of the peak hold transistor (PH) 16 is connected to the capacitor (Csig) 26 through the switch transistor (SWsig) 24.

A connection point of the switch transistor (SWsig) 24 and the capacitor (Csig) 26 is connected to a gate of a p-channel source follower transistor (SFsig) 34. A source of the source follower transistor (SFsig) 34 is connected to an output line 42 through a row selection transistor (SELsig) 36.

Figure 18:
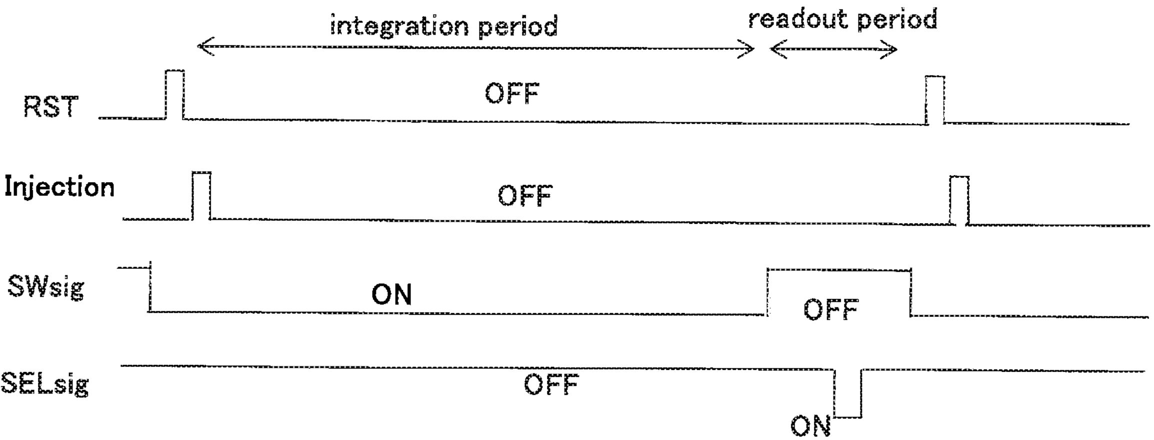
FIG. 18 is a timing chart illustrating operation of the circuit in FIG. 17.

FIG. 18 is a timing chart illustrating operation of the circuit in FIG. 17. In a state where the switch transistor (SWsig) 24 is on and the row selection transistor (SELsig) 36 is off, the reset transistor (RST) 12 is turned on for a short period. As a result, the photodiode (PD) 10 is reset. Next, the injection power supply 18 is turned on for a short period. The holes are injected into the capacitor (Csig) 26.

The photodiode (PD) 10 starts signal integration from end of the reset. When the predetermined signal integration period (period shorter than above-described one frame period) ends, the switch transistor (SWsig) 24 is turned off. The signal integration period is the same among all the pixels. Further, an off period of the switch transistor (SWsig) 24 corresponds to a readout period for all the pixels. During the readout period, readout is sequentially performed on the pixels of the rows. In the pixel in the example of the drawing, readout is performed at an intermediate timing of the readout period.

As described above, according to the diagram in FIG. 16, the row-sequential signal readout can be performed while the signal integration period is made the same among all the pixels by the intermittent integration.

Figure 19:
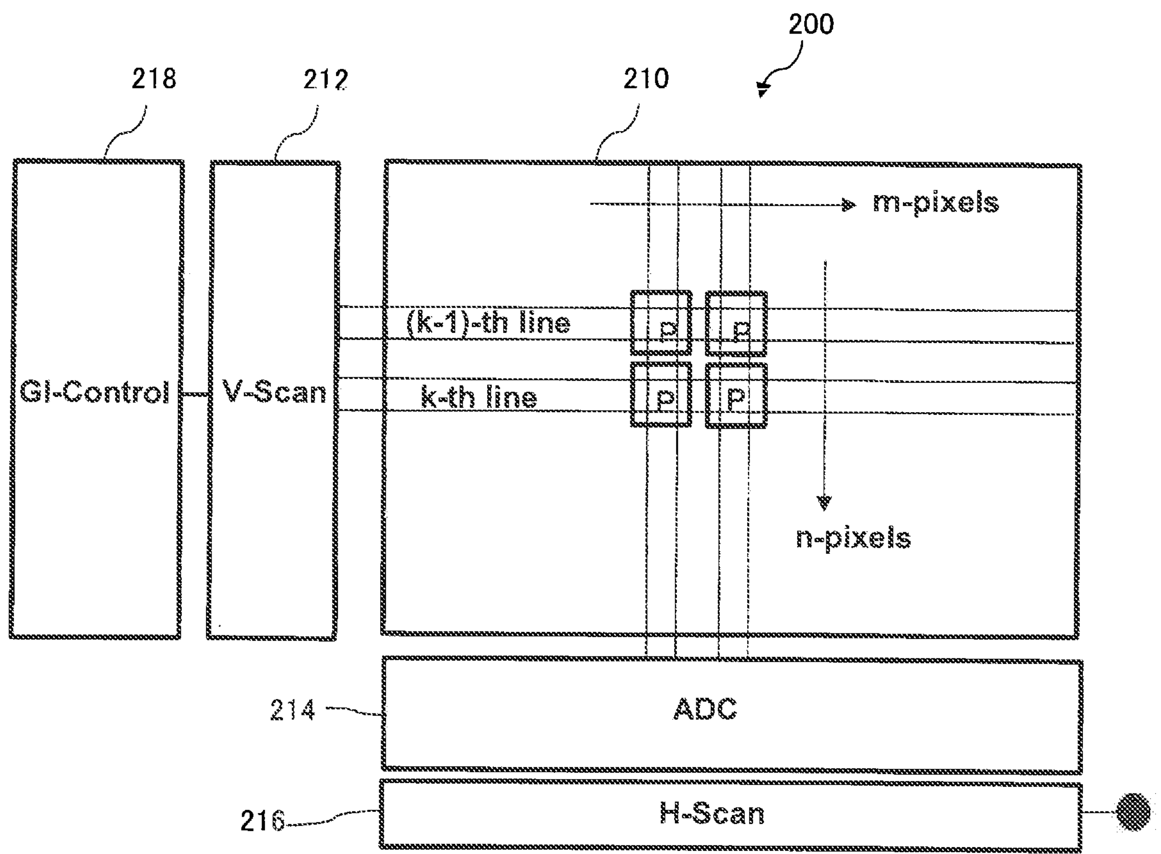
FIG. 19 is a diagram illustrating a configuration of an image sensor.

FIG. 19 is a diagram illustrating a configuration of an image sensor, m*n pixels each illustrated in FIG. 17 are two-dimensionally arranged, the vertical scan circuit (V-Scan) 212, the AD converter (ADC) 214, the horizontal scan circuit (H-Scan) 216 are disposed, and a global integration control circuit (GI-control) 218 is connected to the vertical scan circuit (V-Scan) 212. As compared with FIG. 5, the global integration control circuit 218 is added.

Figure 20:
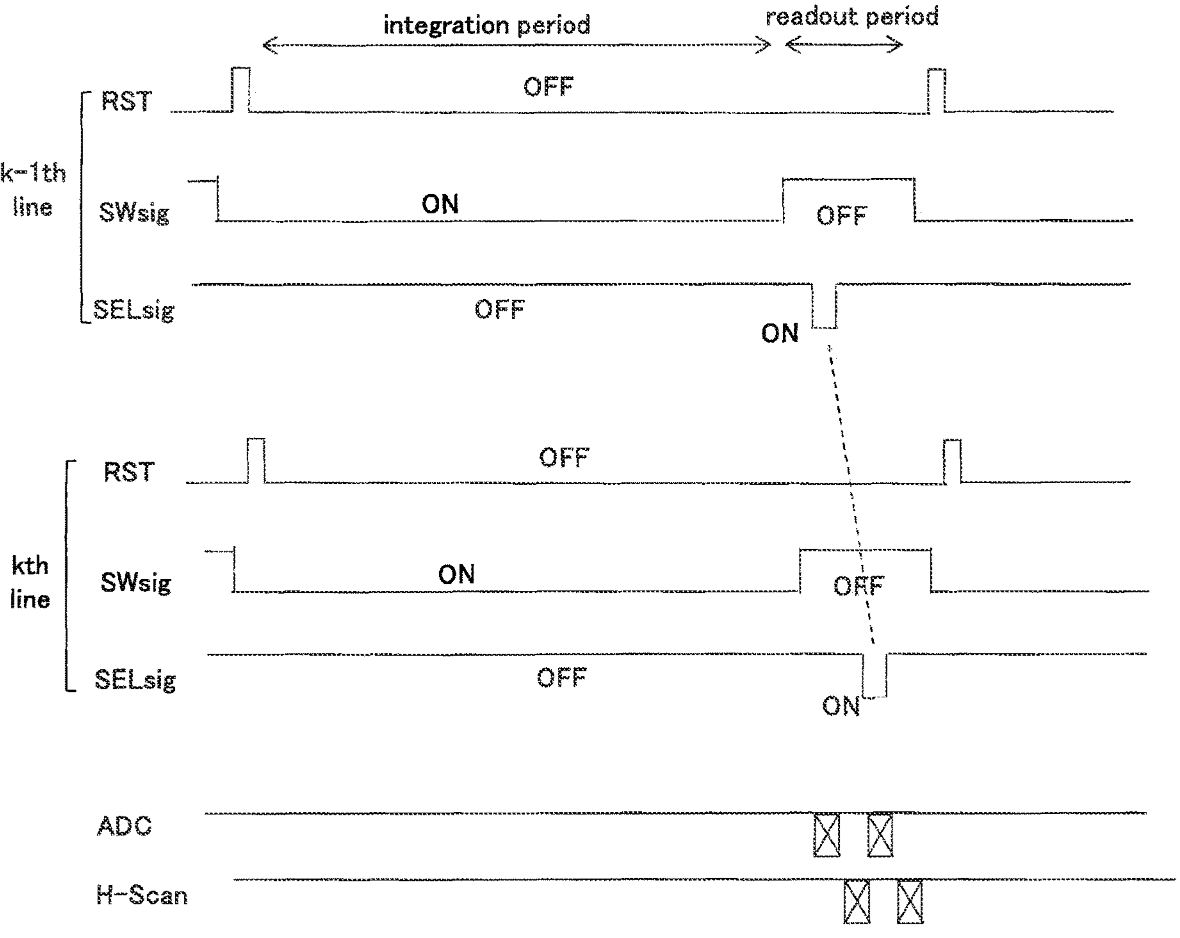
FIG. 20 is a timing chart illustrating operation of the image sensor in FIG. 19.

FIG. 20 is a timing chart illustrating operation of the image sensor in FIG. 19. As illustrated, a timing when the row selection transistor (SELsig) 36 is turned on is different between the k−1-th line and the k-th line. In other words, the timing when the row selection transistor (SELsig) 36 is shifted among the rows, and accordingly, the signals of the pixels of the rows are sequentially read out.

The readout signals of each row are AD-converted by the ADC 214, and are then sequentially output pixel by pixel by the horizontal scan circuit 216.

As described above, the switch transistors (SWsig) 24 of the m*n pixels are simultaneously turned on to reset the photodiodes (PD) 10 operating in a photovoltaic mode, the holes are injected into the capacitors (Csig) 26 of the peak hold circuits, and then, the signal integration is started. Note that illustration of a hole injection timing is omitted.

After the switch transistors (SWsig) 24 of all the pixels are simultaneously turned off, the row selection transistors (SELsig) 36 are turned on row by row to read the signals from the source follower transistors (SFsig) 34. After the AD conversion, the horizontal scan circuit (H-scan) 216 sequentially reads out the digital signals.

The pixel circuit in FIG. 17 is not an electronic shutter expanding a dynamic range, but has an insensitive period. If an LED emission period overlaps with the insensitive period, flicker may slightly occur. The pixel circuit is not to expand the dynamic range. Therefore, the readout period is reduced by a high-speed readout technique. Examples of the high-speed readout technique include a method in which a plurality of lines are simultaneously AD-converted and read out. When N lines are simultaneously read out, the readout period can be reduced to 1/N. Increase in operation speed of a CMOS transistor in recent years enables short-time readout, and readout at the timings illustrated in FIG. 20 is performable.

In the above-described manner, the signals of the pixels accumulated at the same timing are intermittently output row by row.

Pixel Circuit (1) of Seamless Integration

Figure 21:
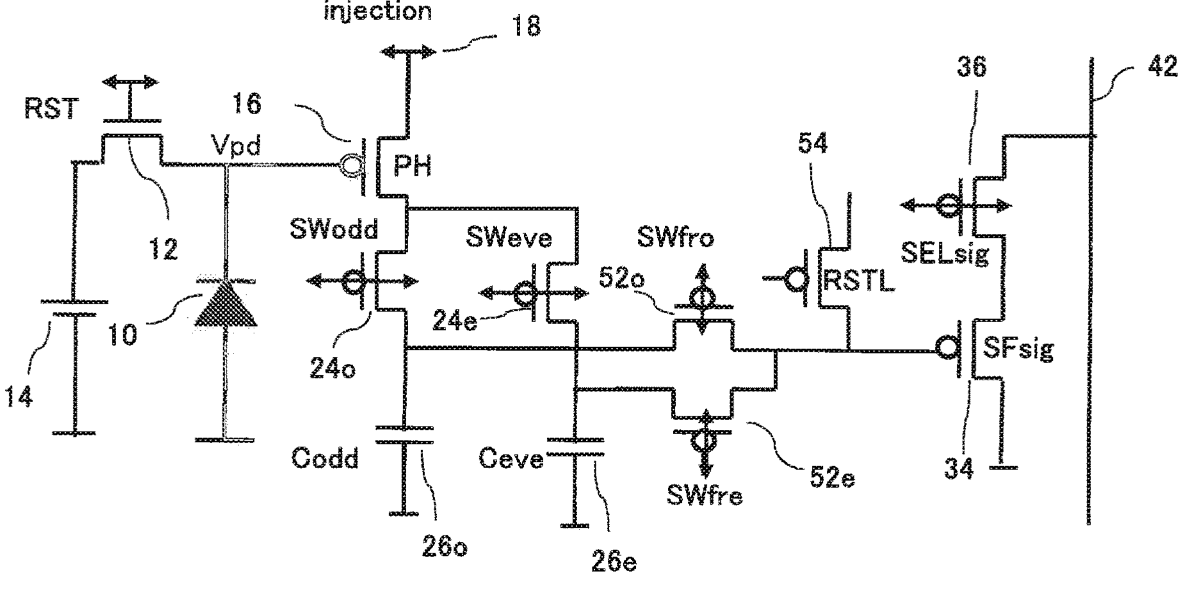
FIG. 21 is a diagram illustrating a configuration of a pixel circuit (1) performing seamless integration.

FIG. 21 is a diagram illustrating a configuration of a pixel circuit (1) performing the seamless integration. In the pixel configuration in FIG. 17, the insensitive period when signal integration is not performed is present. If the LED emission period overlaps with the insensitive period, flicker may slightly occur.

In the configuration in FIG. 21, a switch transistor (SWodd) 240 and a capacitor (Codd) 260 for an odd-numbered frame, and a switch transistor (SWeve) **24*e* and a capacitor (Ceve) 26*e*** for an even-numbered frame are provided. This makes it possible to seamlessly read out a screen having simultaneity.

The two capacitors (Codd and Ceve) 260 and **26*e* are connected to the drain of the peak hold transistor (PH) 16 through the two switch transistors (SWodd and SWeve) 240 and 24*e*. Further, a connection point of the switch transistor (SWodd) 240 and the capacitor (Codd) 260 is connected to the gate of the source follower transistor (SFsig) 34 through a switch transistor (SWfro) 520. A connection point of the switch transistor (SWeve) 24*e* and the capacitor (Ceve) 26*e* is connected to the gate of the source follower transistor (SFsig) 34 through a switch transistor (SWfre) 52*e*. Further, a reset transistor (RSTL) 54 is also connected to the gate of the source follower transistor (SFsig) 34**.

Figure 22:
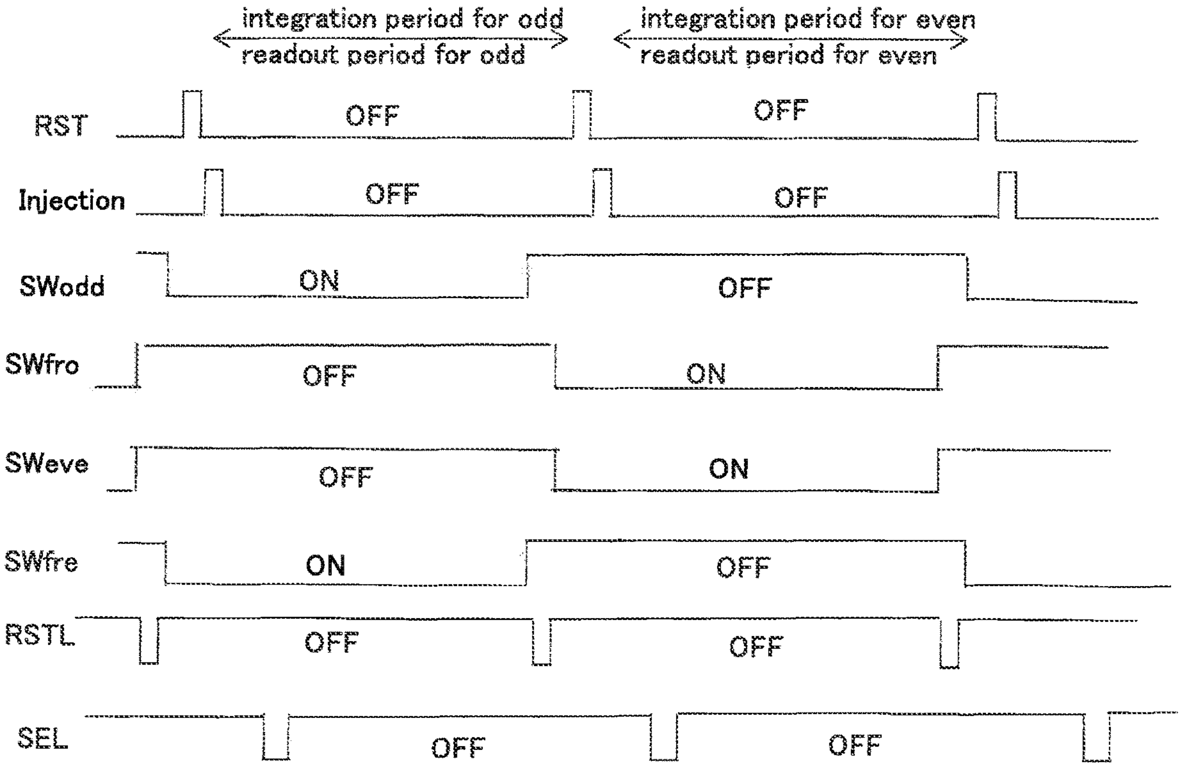
FIG. 22 is a timing chart illustrating operation of the circuit in FIG. 21.

FIG. 22 is a timing chart illustrating operation of the circuit in FIG. 21.

In the odd-numbered frame, the switch transistor (SWodd) 240 is turned on, and the switch transistor (SWeve) **24*e* is turned off. After the photodiode (PD) 10 is reset and the holes are injected into the capacitor (Codd) 260, the charges are accumulated in the capacitor (Codd) 260. Further, the switch transistor (SWodd) 240 is turned off to end the integration period. Next, in the even-numbered frame, the switch transistor (SWfro) 520 is turned on to enable the voltage of the capacitor (Codd) 260 to be read out. At an appropriate timing of the even-numbered frame, the row selection transistor (SELsig) 36 is turned on to read out the voltage set in the capacitor (Codd) 260 in the odd-numbered frame. The gate of the source follower transistor (SFsig) 34 after end of the readout is reset by turning on the reset transistor (RSTL) 54** for a short period.

In the even-numbered frame, the switch transistor (SWeve) 24*e* is turned on, and the switch transistor (SWodd) 240 is turned off. After the photodiode (PD) 10 is reset and the holes are injected into the capacitor (Ceve) 26*e*, the charges are accumulated in the capacitor (Ceve) 26*e*. Thereafter, the switch transistor (SWeve) 24*e* is turned off to end the integration period. Next, in the odd-numbered frame, the switch transistor (SWfre) is turned on to enable the voltage of the capacitor (Ceve) 26*e* to be read out. At an appropriate timing of the odd-numbered frame, the row selection transistor (SELsig) 36 is turned on to read out the voltage set in the capacitor (Ceve) 26*e* in the even-numbered frame.

As described above, the operation of the odd-numbered frame and the operation of the even-numbered frame are switched by switching the switch transistors (SW) 240, 24*e*, 520, and 52*e*. In other words, in the odd-numbered frame, the signal of the odd-numbered frame is accumulated in the capacitor (Codd) 260, and the signal accumulated in the capacitor (Ceve) 26*e* in the previous even-numbered frame is read out. In the even-numbered frame, the signal of the even-numbered frame is accumulated in the capacitor (Codd) 260, and the signal accumulated in the capacitor (Ceve) 26*e* in the previous odd-numbered frame is read out. This enables the seamless readout.

Figure 23:
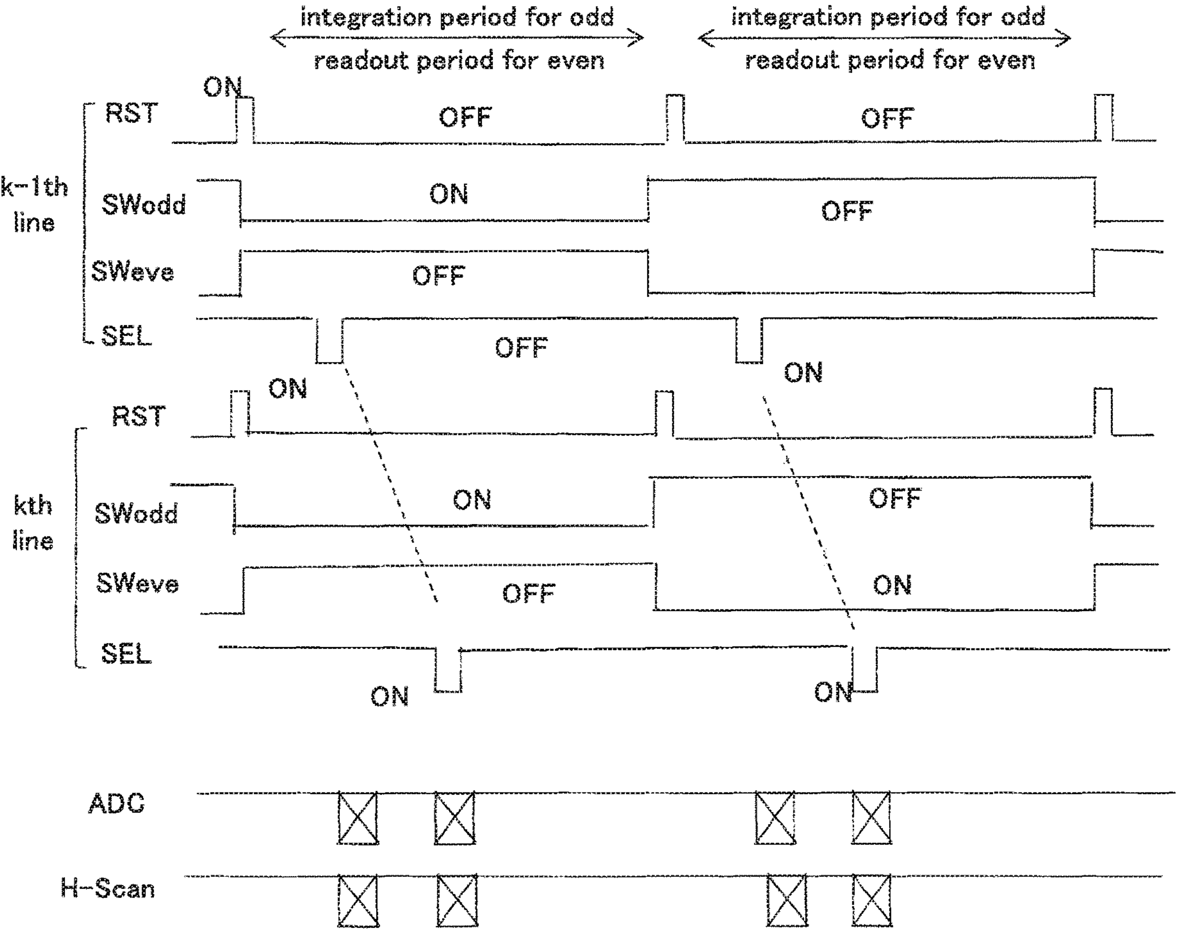
FIG. 23 is a timing chart illustrating the operation of the image sensor in a case where the pixel circuit in FIG. 21 is adopted.

FIG. 23 is a timing chart illustrating operation of the image sensor in a case where the pixel circuit in FIG. 21 is adopted. The entire configuration of the image sensor is illustrated in FIG. 19. Here, the injection pules and RSTL pulses in FIG. 22 are omitted.

As illustrated, in the odd-numbered frame, the signals are accumulated in the capacitors (Codd) 260 in all of the rows, and the signals of the capacitors (Ceve) 26*e* of the rows are sequentially read out. In contrast, in the even-numbered frame, the signals are accumulated in the capacitors (Ceve) 26*e* in all of the rows, and the signals of the capacitors (Codd) 260 of the rows are sequentially read out.

In the above-described manner, the signals of the pixels accumulated at the same timing are seamlessly output. Note that, in this example, the AD conversion is performed by the AD converter 214, and the readout period by the horizontal scan circuit (H-scan) 216 is within one frame period. Accordingly, the high-speed readout as in the example in FIG. 20 is unnecessary.

Pixel Circuit (2) of Seamless Integration

Figure 24:
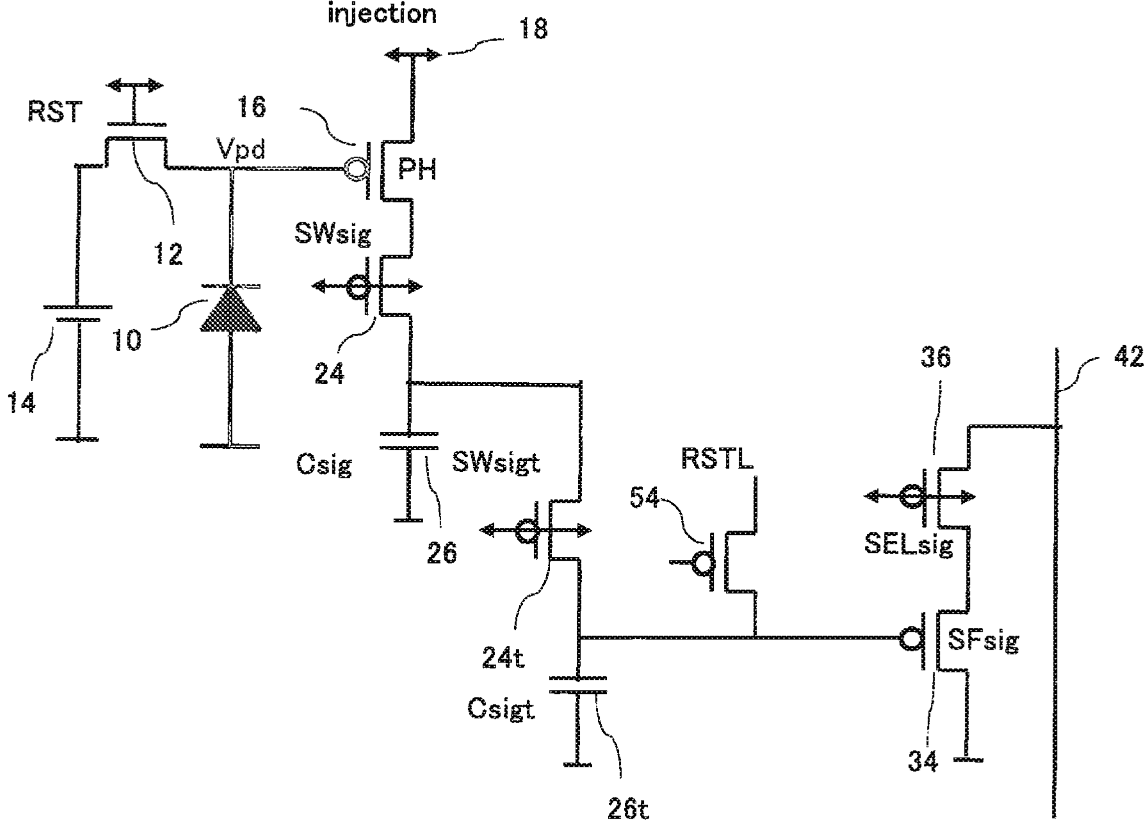
FIG. 24 is a diagram illustrating a configuration of a pixel circuit (2) performing the seamless integration.

FIG. 24 is a diagram illustrating a configuration of a pixel circuit (2) performing the seamless integration. In this example, the capacitor (Csig) 26 is connected to the drain of the peak hold transistor (PH) 16, and a capacitor (Csigt) 26*t* is connected to the drain of the peak hold transistor (PH) 16 through a switch transistor (SWsigt) 24*t* for transfer.

Further, a connection point of the switch transistor (SWsigt) 24*t* and the capacitor (Csigt) 26*t* is connected to the gate of the source follower transistor (SFsig) 34. The reset transistor (RSTL) 54 is also connected to the gate of the source follower transistor (SFsig) 34. The source of the source follower transistor (SFsig) 34 is connected to the output line 42 through the row selection transistor (SELsig) 36.

Figure 25:
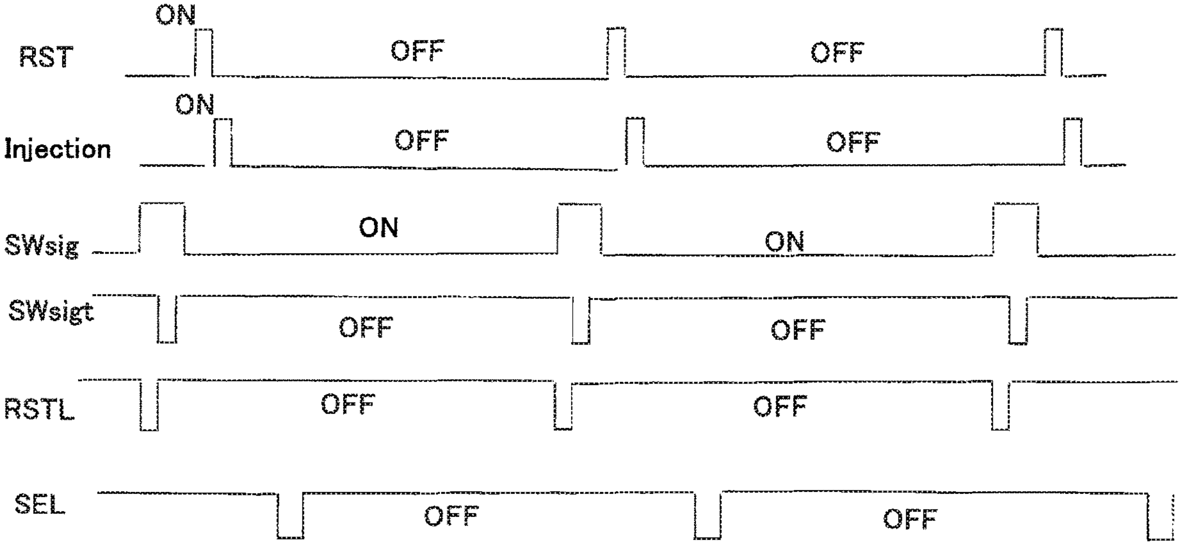
FIG. 25 is a timing chart illustrating operation of the circuit in FIG. 24.

FIG. 25 is a timing chart illustrating operation of the circuit in FIG. 24.

In an n−1-th frame, in a state where the switch transistor (SWsig) 24 is on and the switch transistor (SWsigt) 24*t* is off, the signal is accumulated in the capacitor (Csig) 26. Note that reset of the photodiode (PD) 10 and injection of the holes into the capacitor (Csig) 26 are performed in the manner same as above. Further, the switch transistor (SWsig) 24 is turned off to end accumulation. When the switch transistor (SWsigt) 24*t* is turned on while the switch transistor (SWsig) 24 is kept off, the capacitor (Csigt) 26*t* is connected in parallel to the capacitor (Csig) 26. As a result, the signal is transferred such that the capacitor (Csigt) 26*t* and the capacitor (Csig) 26 each have the same voltage. In a next n-th frame, the signal in the n−1-th frame accumulated in the capacitor (Csigt) 26*t* is read out. Further, the switch transistor (SWsig) 24 is turned off, and the reset transistor 54 is turned on immediately before the switch transistor (SWsigt) 24*t* is turned on to reset the gate of the source follower transistor (SFsig) 34.

Figure 26:
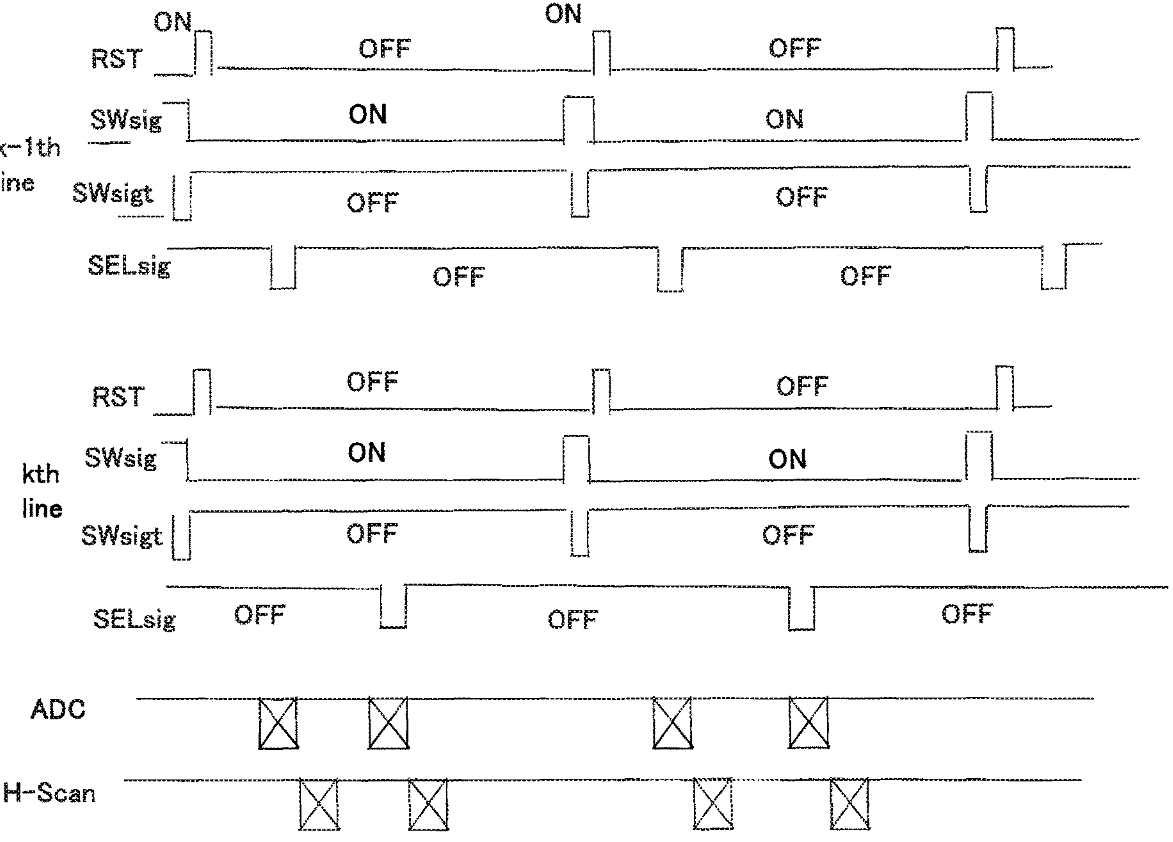
FIG. 26 is a timing chart illustrating operation of an image sensor in which m*n pixels each illustrated in FIG. 24 are two-dimensionally arranged.

The image sensor in which m*n pixels each illustrated in FIG. 24 are two-dimensionally arranged has the configuration same as the image sensor illustrated in FIG. 19, but is different in operation from the image sensor illustrated in FIG. 19. FIG. 26 is a timing chart illustrating operation of the image sensor in which m*n pixels each illustrated in FIG. 24 are two-dimensionally arranged. Here, the injection pules and RSTL pulses in FIG. 25 are omitted.

The switch transistors (SWsig) 24 of the m*n pixels are simultaneously turned on to reset the photodiodes (PD) 10, and the holes are injected into the capacitors (Csig) 26 to start accumulation of the signals. In this example, a timing chart of injection of the holes is omitted.

After the switch transistors (SWsig) 24 of all the pixels are simultaneously turned off and the gates of the source follower transistors (SFsig) 34 are reset, the switch transistors (SWsigt) 24*t* are turned on to transfer the signals to the capacitors (Csigt) 26*t*.

The row selection transistors (SELsig) 36 are sequentially turned on row by row to read out the signals of the odd frames from the source follower transistors (SFsig) 34. After the AD conversion is performed by the AD converter 214, the digital signals are sequentially read out by the horizontal scan circuit (H-scan) 216.

Intermittent Integration+Separated Noise Readout

Figure 27:
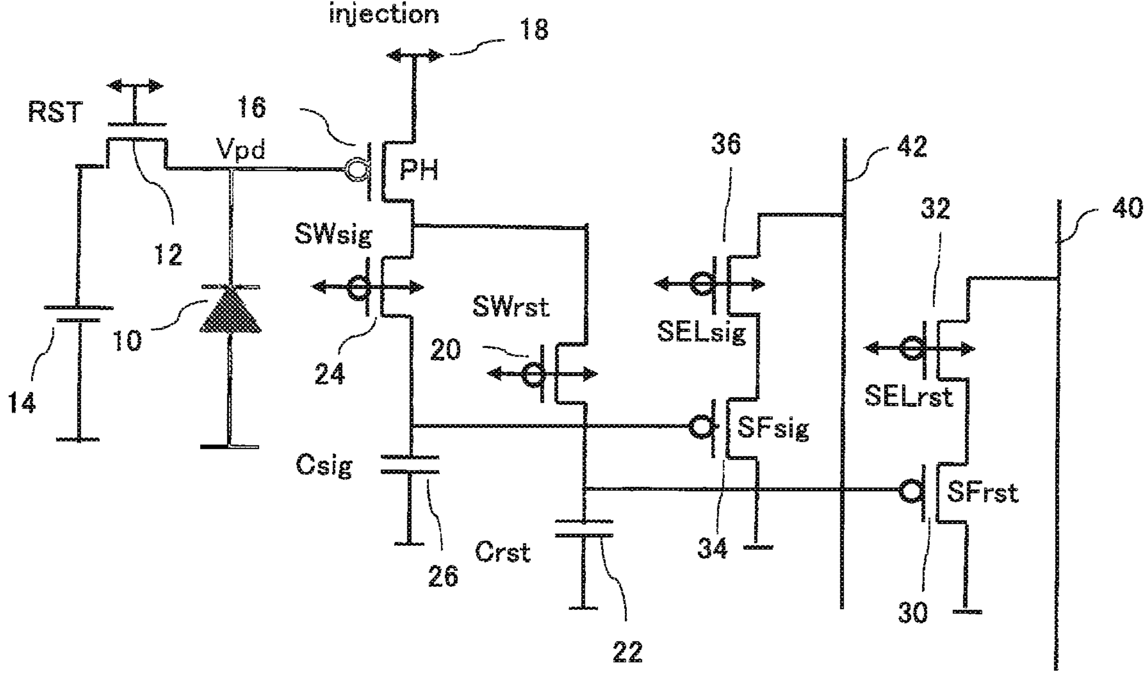
FIG. 27 is a diagram illustrating a configuration of a pixel circuit obtained by adding a circuit detecting noise at reset in FIG. 3 to the circuit in FIG. 17.

FIG. 27 is a diagram illustrating a configuration of a pixel circuit obtained by adding the circuit detecting the noise at reset in FIG. 3 to the circuit in FIG. 17.

As illustrated, as compared with the circuit in FIG. 17, the switch transistor (SWrst) 20, the capacitor (Crst) 22, the source follower transistor (SFrst) 30, and the row selection transistor (SELrst) 32 are added. Connection relationship and the like of these components are similar to those in FIG. 3.

Figure 28:
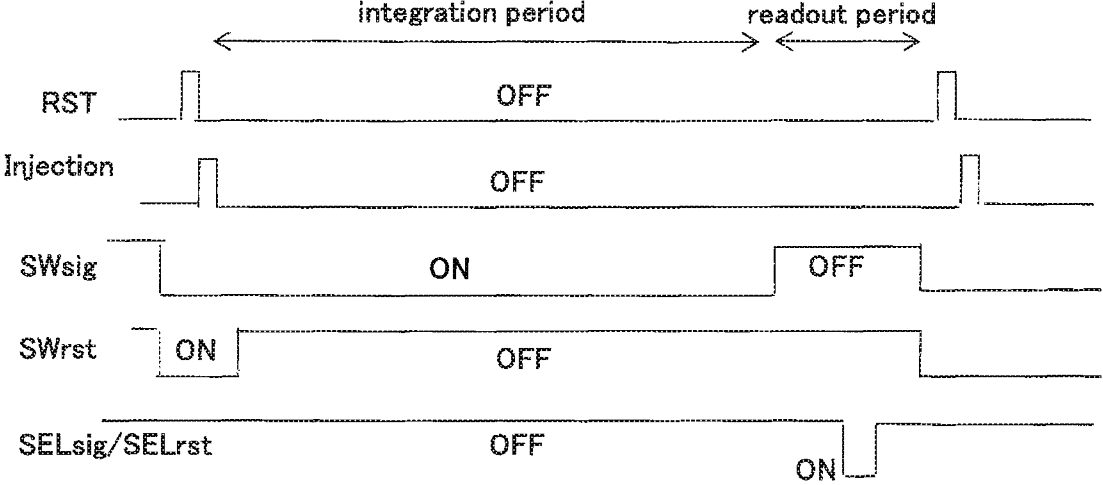
FIG. 28 is a timing chart illustrating operation of the circuit in FIG. 27.

FIG. 28 is a timing chart illustrating operation of the circuit in FIG. 27. In a state where the switch transistors (SWrst and SWsig) 20 and 24 are on, the reset transistor (RST) 12 and the injection power supply are sequentially turned on for a short period, to reset the photodiode (PD) 10 and to inject the holes into the capacitors (Csig and Crst) 26 and 22. Thereafter, the switch transistor 20 is turned off to cause the capacitor 22 to hold the noise at the reset. After the integration period ends, the switch transistor (SWsig) 24 is turned off to cause the capacitor (Csig) 26 to hold the signal. The operation is performed on all the pixels at the same timing.

Further, the noise and the signal held in the capacitors (Crst and Csig) 22 and 26 are output to the output lines 40 and 42 by turning on the row selection transistors (SELrst and SELsig) 32 and 36. The signal output is sequentially performed row by row during the readout period after the integration period.

Seamless Integration (1)+Separated Noise Readout

Figure 29:
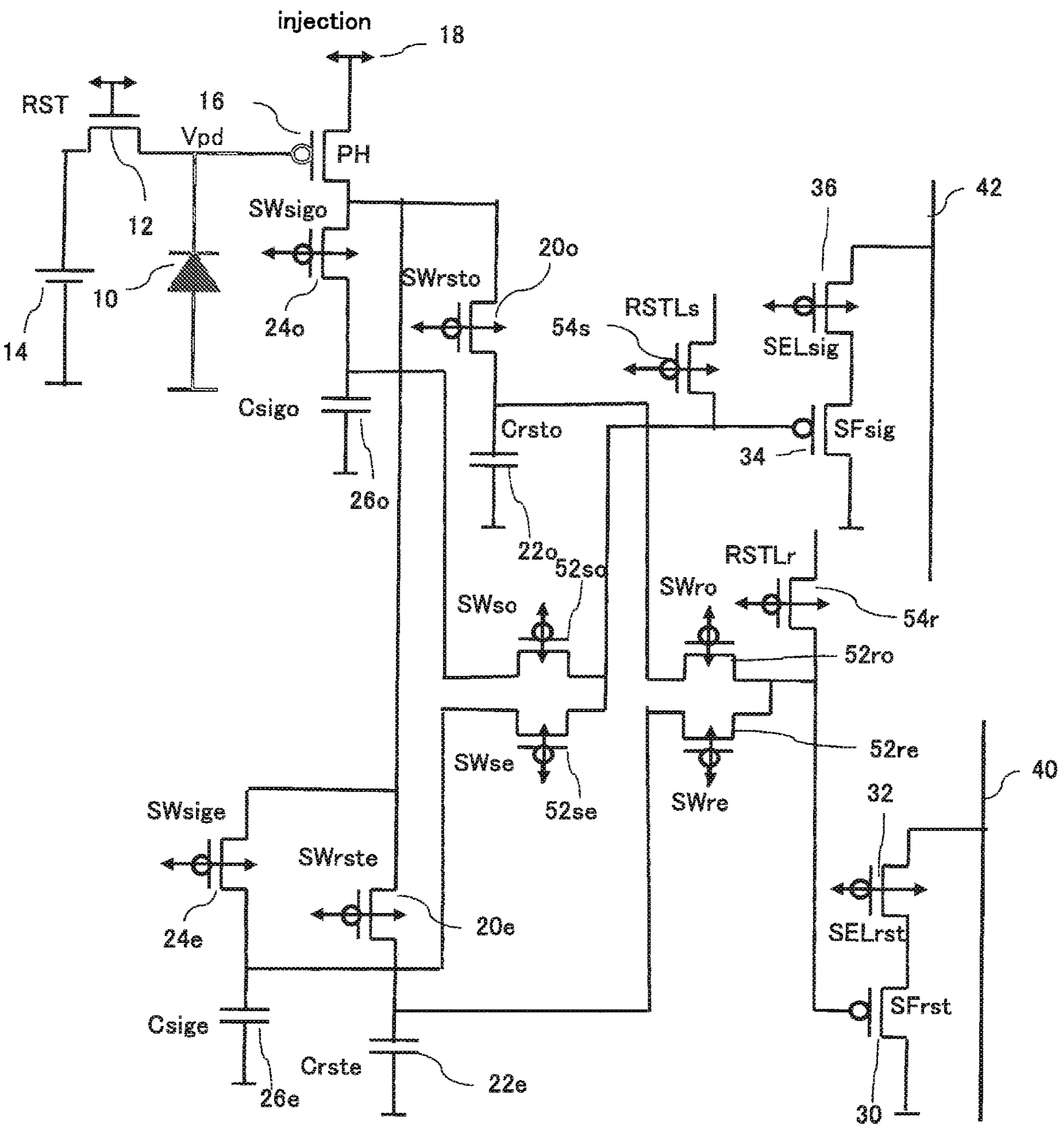
FIG. 29 is a diagram illustrating a configuration of a pixel circuit obtained by adding the circuit detecting the noise at reset in FIG. 3 to the circuit in FIG. 21.

FIG. 29 is a diagram illustrating a configuration of a pixel circuit obtained by adding the circuit detecting the noise at reset in FIG. 3 to the circuit in FIG. 21.

As illustrated, as compared with the circuit in FIG. 21, switch transistors (SWrsto and SWrste) 200 and 20*e*, capacitors (Crsto and Crste) 220 and 22*e*, switch transistors (SWro and SWre) 52*ro* and 52*re*, a reset transistor (RSTLr) 54*r*, the source follower transistor (SFrst) 30, and the row selection transistor (SELrst) 32 are added. Connection relationship and the like of these components are similar to those in FIG. 3.

In other words, the circuit processing the noise at reset is provided in parallel to the circuit processing the signal, on a downstream side of the peak hold transistor (PH) 16 of the circuit in FIG. 21.

Figure 30:
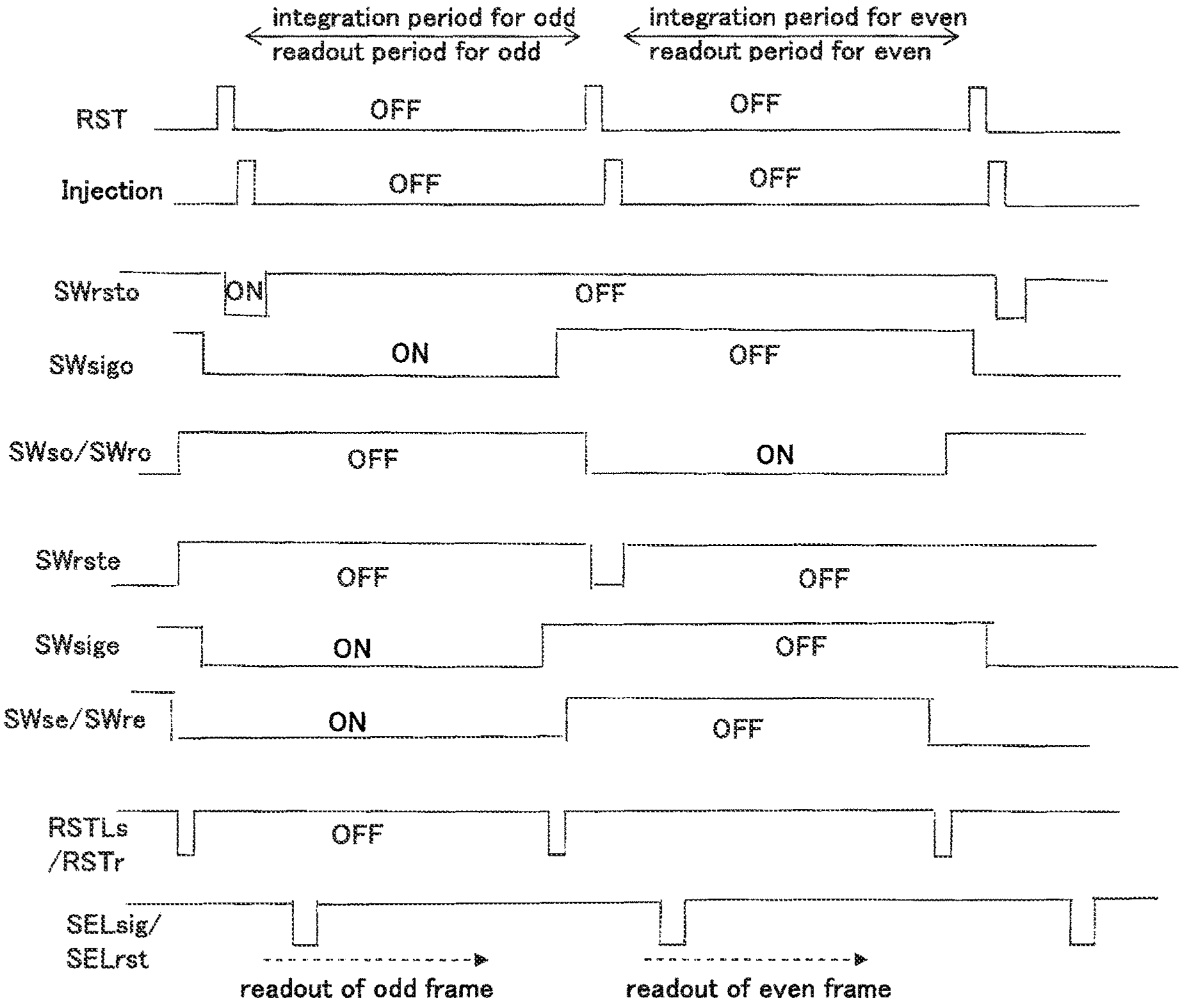
FIG. 30 is a timing chart illustrating operation of the circuit in FIG. 29.

FIG. 30 is a timing chart illustrating operation of the circuit in FIG. 29.

In the odd-numbered frame, the photodiode (PD) 10 is reset, and the holes are injected into the capacitors (Crsto and Csigo) 220 and 260 by the injection power supply. Further, the noise immediately after the reset is held in the capacitor (Crsto) 220, and the signal is accumulated in the capacitor (Csigo) 260. Further, in a next frame, the row selection transistors (SELrst and SELsig) 32 and 36 are sequentially turned on to sequentially output the signal and the noise accumulated in the capacitors (Crsto and Csigo) 220 and 260 of each pixel.

In the even-numbered frame, likewise, the noise and the signal are accumulated in the capacitors (Crste and Csige) 22*e* and 26*e*, and are output.

Seamless Integration (2)+Separated Noise Readout

Figure 31:
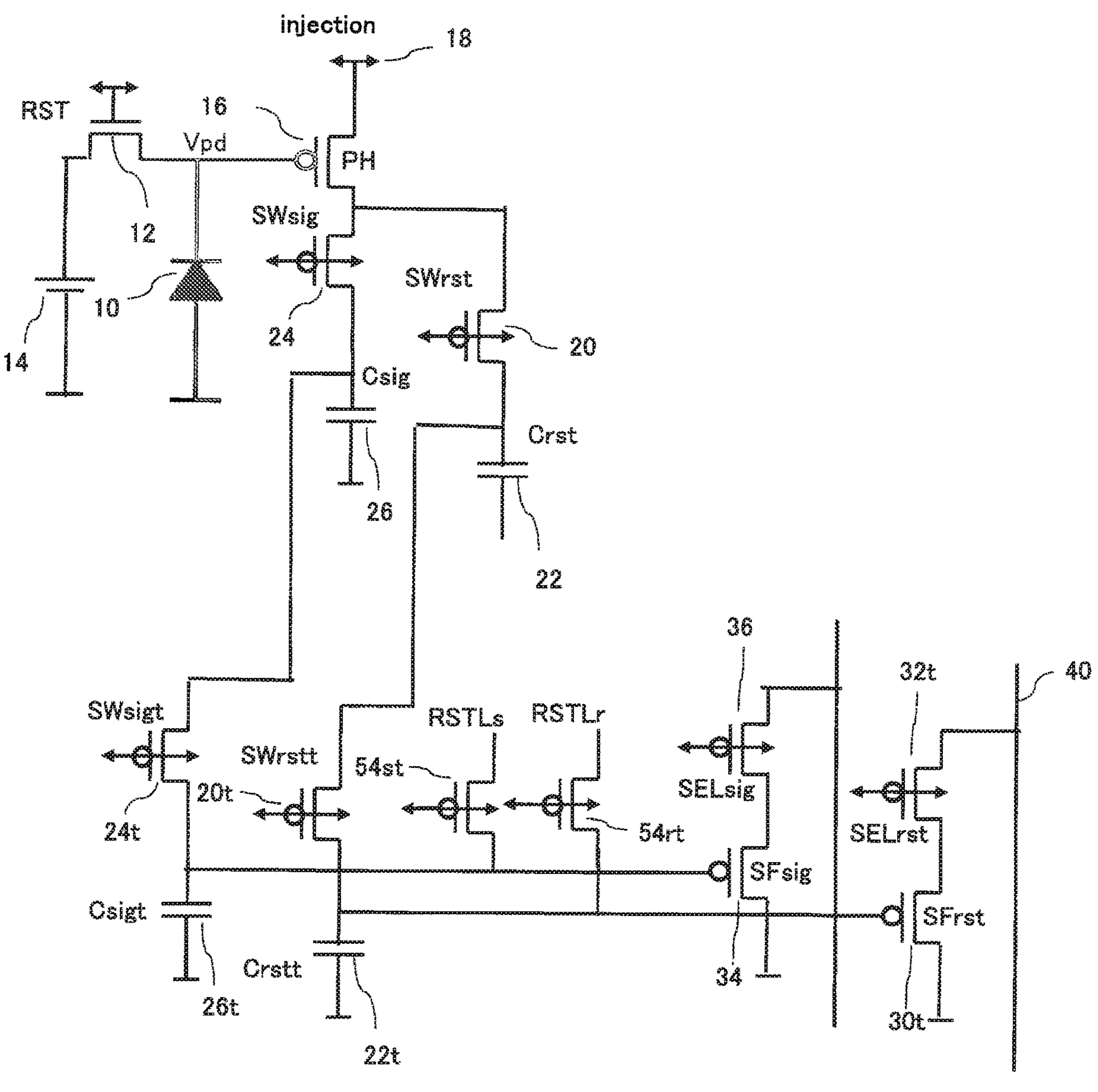
FIG. 31 is a diagram illustrating a configuration of a pixel circuit obtained by adding the circuit detecting the noise at reset in FIG. 3 to the circuit in FIG. 24.

FIG. 31 is a diagram illustrating a configuration of a pixel circuit obtained by adding the circuit detecting the noise at reset in FIG. 3 to the circuit in FIG. 24.

As illustrated, as compared with the circuit in FIG. 24, the switch transistor (SWrst) 20, the capacitor (Crst) 22, a switch transistor (SWrstt) 20*t*, a reset transistor (RSTLr) 54*rt*, the source follower transistor (SFrst) 30, and the row selection transistor (SELrst) 32 are added. Connection relationship and the like of these components are similar to those in FIG. 3.

In other words, the circuit processing the noise at reset is provided in parallel to the circuit processing the signal, on the downstream side of the peak hold transistor (PH) 16 of the circuit in FIG. 24.

Figure 32:
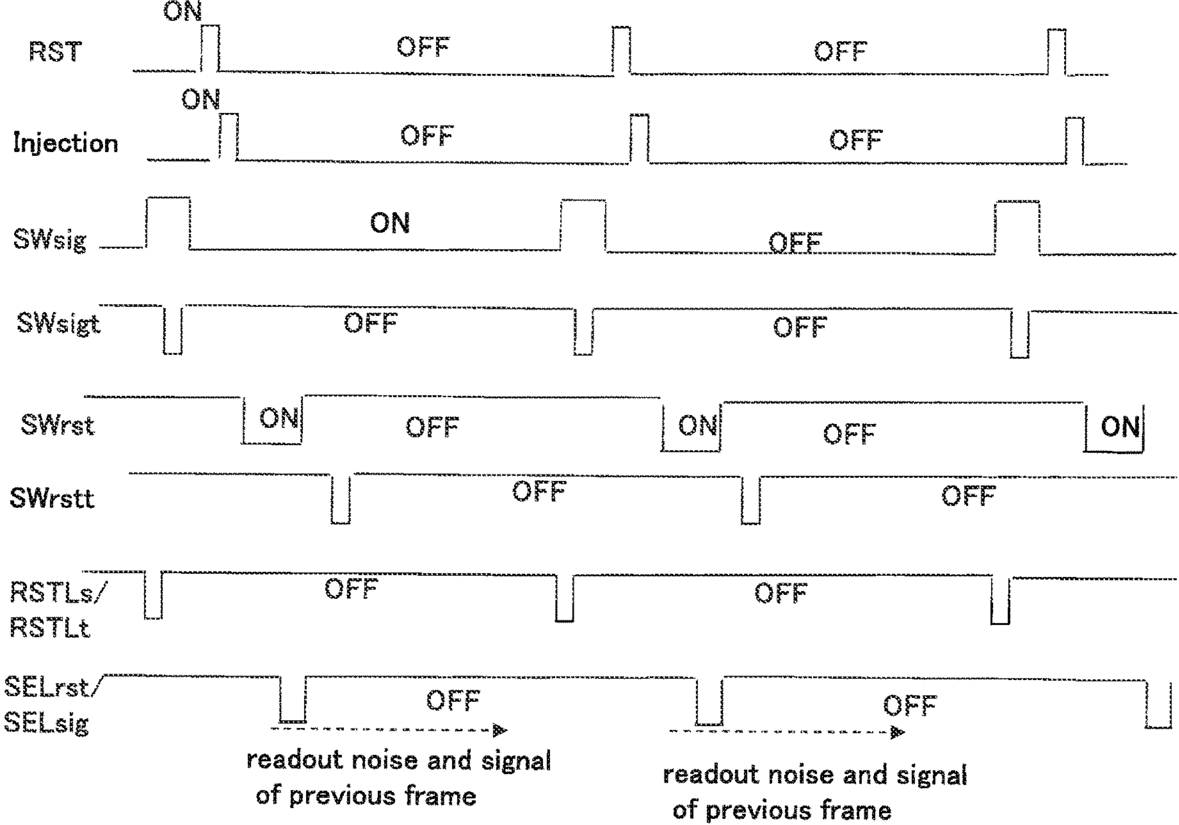
FIG. 32 is a timing chart illustrating operation of the circuit in FIG. 31.

FIG. 32 is a timing chart illustrating operation of the circuit in FIG. 31.

The photodiode (PD) 10 is reset, and the holes are injected into the capacitors (Crst and Csig) 22 and 26 by the injection power supply 18. After the noise immediately after the reset is held in the capacitor (Crst) 22, the held noise is transferred to the capacitor (Crstt) 22*t*. In addition, the signal is accumulated in the capacitor (Csig) 26, and after the signal integration period ends, the accumulated signal is transferred to the capacitor (Csigt) 26*t*.

In a next frame, the row selection transistors (SELrst and SELsig) 32 and 36 are sequentially turned on to sequentially output the signal and the noise accumulated in the capacitors (Csigt and Crstt) 26*t* and 22*t* of each pixel.

Features of Global Integration

In the following, features of the image sensor using the global integration are described.

(i) An image sensor including a plurality of pixels arranged in a matrix, in which each of the pixels includes a photodiode configured to generate charges based on a light incident amount, a reset transistor configured to reset the photodiode by supplying a reset voltage to the photodiode, a peak hold transistor configured to allow a current to flow there through based on an output voltage of the photodiode, an injection power supply connected to one end of the peak hold transistor and configured to supply an injection voltage, a first switch transistor connected to another end of the peak hold transistor and configured to perform control, and a first capacitor configured to accumulate charges corresponding to a current from the first switch transistor, and during a same signal integration period in one frame period, signals are accumulated in the first capacitors of the respective pixels, and are then output horizontal line by horizontal line.

(ii) The one frame period is divided into a signal integration period and a readout period after the signal integration period, and the signals accumulated in the first capacitors of the respective pixels during the integration period are sequentially output line by line.

(iii) The pixels are divided into an odd-numbered group and an even-numbered group, in an odd-numbered frame, the signals are accumulated in the pixels of the odd-numbered group, and the signals accumulated in a previous frame are output from the pixels of the even-numbered group, and in an even-numbered frame, the signals are accumulated in the pixels of the even-numbered group, and the signals are output from the pixels of the odd-numbered group.

(iv) In each of the pixels in each frame, the signal is accumulated in the first capacitor, and then, the signal accumulated in the first capacitor is transferred to a corresponding transfer capacitor, and the signal transferred in the previous frame and held is output from the transfer capacitor.

(v) An image sensor including a plurality of pixels, in which each of the pixels includes a photodiode configured to generate charges based on a light incident amount, has a reset transistor configured to reset the photodiode. By supplying a reset voltage to the photodiode, a first capacitor is configured to hold an output voltage of the photodiode immediately after the reset, and a second capacitor is configured to hold the output voltage of the photodiode after a predetermined exposure period. The image signal is obtained from the voltage held by the first capacitor and the voltage held by the second capacitor. During a same signal integration period in one frame period, signals are accumulated in the first capacitors of the respective pixels, and are then output horizontal line by horizontal line.

What is claimed is:

1. An image sensor including a plurality of pixels, wherein each of the pixels comprises:

a photodiode (PD) configured to generate charges based on a light incident amount;

a reset transistor (RST) configured to supply a reset voltage to the photodiode by supplying a reset voltage to the photodiode;

a peak hold transistor (PH), wherein the peak hold transistor is a p-channel transistor, and wherein a gate terminal of the peak hold transistor is coupled directly to the photodiode;

an injection power supply coupled to a source terminal of the peak hold transistor, wherein the injection power supply supplies a hole injection pulse, and wherein the injection power supply toggles between one of high and low voltages;

a first switch transistor coupled between a drain terminal of the peak hold transistor and a first capacitor;

the first capacitor configured to hold an output voltage of the photodiode immediately after a photodiode reset pulse supplied to a gate terminal of the reset transistor;

a second switch transistor coupled between the drain terminal of the peak hold transistor and a second capacitor; and the second capacitor configured to hold the output voltage of the photodiode after a predetermined exposure period, wherein an image signal is obtained from the voltage held by the first capacitor and the voltage held by the second capacitor.

2. The image sensor according to claim 1, wherein at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold the voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

3. The image sensor according to claim 2, wherein each of the pixels further includes a first output transistor configured to output a signal corresponding to the voltage of the first capacitor, and a second output transistor configured to output a signal corresponding to the voltage of the second capacitor.

4. The image sensor according to claim 1, wherein the image signal is obtained by subtracting the voltage held by the first capacitor from the voltage held by the second capacitor.

5. The image sensor according to claim 1, wherein at the reset of the photodiode, the injection voltage is supplied to the one end of the peak hold transistor, and the first switch transistor is turned on to inject the charges to the first capacitor, and after supply of the reset voltage and the injection voltage is stopped, the first switch transistor is turned off to cause the first capacitor to hold the voltage corresponding to the output of the photodiode immediately after the reset, and in a state where the first switch transistor is turned off, the second switch transistor is turned on, and the injection voltage is supplied to the one end of the peak hold transistor to inject the charges to the second capacitor, and after supply of the injection voltage is stopped and the predetermined exposure period elapses in the state, the second switch transistor is turned off to cause the second capacitor to hold the voltage corresponding to the light incident amount in the exposure period.

6. The image sensor according to claim 5, wherein each of the pixels further includes a first output transistor configured to output a signal corresponding to the voltage of the first capacitor, and a second output transistor configured to output a signal corresponding to the voltage of the second capacitor.

7. The image sensor according to claim 1, wherein at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold the voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

8. The image sensor according to claim 7, wherein each of the pixels further includes an output transistor including a control end connected to an output end of the first capacitor and an output end of the second capacitor and configured to output a signal corresponding to the control end, and a peak hold reset transistor connected to the control end of the output transistor and configured to supply a peak hold reset voltage, after the exposure period ends and the peak hold reset transistor is turned on for a short period in a state where the first switch transistor and the second switch transistor are turned off, to reset the control end of the output transistor, the first switch transistor is turned on to output a signal corresponding to the voltage held by the first capacitor, from the output transistor, and after the peak hold reset transistor is turned on for a short period in the state where the first switch transistor and the second switch transistor are turned off, to reset the control end of the output transistor, the second switch transistor is turned on to output a signal corresponding to the voltage held by the second capacitor, from the output transistor.

9. The image sensor according to claim 7, wherein the image signal is obtained by subtracting the voltage held by the first capacitor from the voltage held by the second capacitor.

10. The image sensor according to claim 1, wherein each of the pixels further includes a peak hold transistor configured to allow a current to flow therethrough based on the output voltage of the photodiode, an injection power supply connected to one end of the peak hold transistor and configured to supply an injection voltage, a second switch transistor connected to another end of the peak hold transistor and configured to control a current to the second capacitor, and a first switch transistor connected to the other end of the peak hold transistor through the second switch transistor and configured to control the current to the second capacitor, at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold the voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

11. The image sensor according to claim 10, wherein each of the pixels further includes an output transistor including a control end connected to an output end of the first capacitor and configured to output a signal corresponding to the control end, after the exposure period ends, in a state where the first switch transistor and the second switch transistor are turned off, a signal corresponding to the voltage held by the first capacitor is output from the output transistor, and the first switch transistor is then turned on, and a signal corresponding to a sum of the voltage held by the first capacitor and the voltage held by the second capacitor is output from the output transistor.

12. The image sensor according to claim 10, wherein the image signal is obtained by subtracting ½ of the voltage held by the first capacitor from the sum of the voltage held by the first capacitor and the voltage held by the second capacitor.

13. The image sensor according to claim 1, wherein each of the pixels further includes a peak hold transistor configured to allow a current to flow therethrough based on the output voltage of the photodiode, an injection power supply connected to one end of the peak hold transistor and configured to supply an injection voltage, a second switch transistor including one end connected to another end of the peak hold transistor, a second capacitor connected to another end of the second switch transistor, a first capacitor including one end connected to the other end of the second switch transistor, an output transistor including a control end connected to another end of the first capacitor, and a first switch transistor configured to supply a predetermined voltage to the other end of the first capacitor, at the reset of the photodiode, the injection voltage is supplied to the one end of the peak hold transistor, and the first switch transistor is turned on to supply the predetermined voltage to the other end of the first capacitor and to inject the charges to the first capacitor and the second capacitor, and then, after supply of the reset voltage and the injection voltage is stopped, the first switch transistor is turned off to cause the first capacitor to hold a voltage that corresponds to the output of the photodiode immediately after the reset and is reversed in positive and negative, after the predetermined exposure period elapses in a state where the second switch transistor is turned on, the second switch transistor is turned off to cause the second capacitor to hold the voltage corresponding to the light incident amount in the exposure period, and a voltage is obtained by subtracting the voltage held by the first capacitor from the voltage held by the second capacitor on the other side of the second capacitor, and is applied to the control end of the output transistor to output the image signal from the output end.

14. The image sensor according to claim 1, wherein each of the pixels further includes a peak hold transistor configured to allow a current to flow there through based on the output voltage of the photodiode, an injection power supply connected to one end of the peak hold transistor and configured to supply an injection voltage, a second switch transistor including one end connected to another end of the peak hold transistor, a first capacitor including one end connected to another end of the second switch transistor, a second capacitor including one end connected to another end of the first capacitor, an output transistor including a control end connected to the other end of the first capacitor, and a first switch transistor configured to supply a predetermined voltage to the other end of the first capacitor, at the reset of the photodiode, the injection voltage is supplied to the one end of the peak hold transistor, and the first switch transistor is turned on to supply the predetermined voltage to the other end of the first capacitor and to inject the charges to the first capacitor and the second capacitor, and then, after supply of the reset voltage and the injection voltage is stopped, the first switch transistor is turned off to cause the first capacitor to hold the voltage that corresponds to the output of the photodiode immediately after the reset and is reversed in positive and negative, after the predetermined exposure period elapses in a state where the second switch transistor is turned on, the second switch transistor is turned off to cause the second capacitor to hold the voltage corresponding to the light incident amount in the exposure period, and a voltage is obtained by subtracting the voltage held by the first capacitor from the voltage held by the second capacitor on the other side of the second capacitor, and is applied to the control end of the output transistor to output the image signal from the output end.

15. The image sensor according to claim 1, wherein, during a same signal integration period in one frame period, signals are accumulated in the first capacitors of the respective pixels, and are then output horizontal line by horizontal line.

16. The image sensor according to claim 15, wherein the one frame period is divided into a signal integration period and a readout period after the signal integration period, and the signals accumulated in the first capacitors of the respective pixels during the integration period are sequentially output line by line.

17. The image sensor according to claim 15, wherein the pixels are divided into an odd-numbered row group and an even-numbered row group, in an odd-numbered frame, the signals and the noise are accumulated in the pixels of the odd-numbered row group, and the signals and the noise accumulated in a previous frame are output from the pixels in the even-numbered row group, and in an even-numbered frame, the signals and the noise are accumulated in the pixels of the even-numbered row group, and the signals and the noise are output from the pixels of the odd-numbered row group.

18. The image sensor according to claim 15, wherein in each frame, in each of the pixels, the signal is accumulated in the first capacitor, and then, the signal accumulated in the first capacitor is transferred to a corresponding first transfer capacitor, in each of the pixels, the noise is accumulated in the second capacitor, and then, the noise accumulated in the second capacitor is transferred to a corresponding second transfer capacitor, and the signal and the noise transferred in the previous frame and held are output from the first and second transfer capacitors.

19. The image sensor according to claim 1, wherein each of the photodiodes operates in a logarithmic region of a forward bias at incidence of high-illuminance light.

20. The image sensor according to claim 19, wherein at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold the voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

21. The image sensor according to claim 20, wherein each of the pixels further includes a first output transistor configured to output a signal corresponding to the voltage of the first capacitor, and a second output transistor configured to output a signal corresponding to the voltage of the second capacitor.

22. The image sensor according to claim 19, wherein the image signal is obtained by subtracting the voltage held by the first capacitor from the voltage held by the second capacitor.

23. The image sensor according to claim 19, wherein at the reset of the photodiode, the injection voltage is supplied to the one end of the peak hold transistor, and the first switch transistor is turned on to inject the charges to the first capacitor, and after supply of the reset voltage and the injection voltage is stopped, the first switch transistor is turned off to cause the first capacitor to hold the voltage corresponding to the output of the photodiode immediately after the reset, and in a state where the first switch transistor is turned off, the second switch transistor is turned on, and the injection voltage is supplied to the one end of the peak hold transistor to inject the charges to the second capacitor, and after supply of the injection voltage is stopped and the predetermined exposure period elapses in the state, the second switch transistor is turned off to cause the second capacitor to hold the voltage corresponding to the light incident amount in the exposure period.

24. The image sensor according to claim 23, wherein each of the pixels further includes a first output transistor configured to output a signal corresponding to the voltage of the first capacitor, and a second output transistor configured to output a signal corresponding to the voltage of the second capacitor.

25. The image sensor according to claim 19, wherein at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold the voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

26. The image sensor according to claim 25, wherein each of the pixels further includes an output transistor including a control end connected to an output end of the first capacitor and an output end of the second capacitor and configured to output a signal corresponding to the control end, and a peak hold reset transistor connected to the control end of the output transistor and configured to supply a peak hold reset voltage, after the exposure period ends and the peak hold reset transistor is turned on for a short period in a state where the first switch transistor and the second switch transistor are turned off, to reset the control end of the output transistor, the first switch transistor is turned on to output a signal corresponding to the voltage held by the first capacitor, from the output transistor, and after the peak hold reset transistor is turned on for a short period in the state where the first switch transistor and the second switch transistor are turned off, to reset the control end of the output transistor, the second switch transistor is turned on to output a signal corresponding to the voltage held by the second capacitor, from the output transistor.

27. The image sensor according to claim 25, wherein the image signal is obtained by subtracting the voltage held by the first capacitor from the voltage held by the second capacitor.

28. The image sensor according to claim 19, wherein each of the pixels further includes a peak hold transistor configured to allow a current to flow therethrough based on the output voltage of the photodiode, an injection power supply connected to one end of the peak hold transistor and configured to supply an injection voltage, a second switch transistor connected to another end of the peak hold transistor and configured to control a current to the second capacitor, and a first switch transistor connected to the other end of the peak hold transistor through the second switch transistor and configured to control the current to the second capacitor, at the reset of the photodiode, the injection voltage is supplied to the one end of the peak hold transistor, and the first and second switch transistors are turned on to inject the charges to the first and second capacitors, and after supply of the reset voltage and the injection voltage is stopped, the first switch transistor is turned off to cause the first capacitor to hold a voltage corresponding to the output of the photodiode immediately after the reset, and after the predetermined exposure period elapses in a state where the second switch transistor is turned on, the second switch transistor is turned off to cause the second capacitor to hold the voltage corresponding to the light incident amount in the exposure period.

29. The image sensor according to claim 28, wherein each of the pixels further includes an output transistor including a control end connected to an output end of the first capacitor and configured to output a signal corresponding to the control end, after the exposure period ends, in a state where the first switch transistor and the second switch transistor are turned off, a signal corresponding to the voltage held by the first capacitor is output from the output transistor, and the first switch transistor is then turned on, and a signal corresponding to a sum of the voltage held by the first capacitor and the voltage held by the second capacitor is output from the output transistor.

30. The image sensor according to claim 28, wherein the image signal is obtained by subtracting ½ of the voltage held by the first capacitor from the sum of the voltage held by the first capacitor and the voltage held by the second capacitor.

31. The image sensor according to claim 19, wherein each of the pixels further includes a peak hold transistor configured to allow a current to flow therethrough based on the output voltage of the photodiode, an injection power supply connected to one end of the peak hold transistor and configured to supply an injection voltage, a second switch transistor including one end connected to another end of the peak hold transistor, a second capacitor connected to another end of the second switch transistor, a first capacitor including one end connected to the other end of the second switch transistor, an output transistor including a control end connected to another end of the first capacitor, and a first switch transistor configured to supply a predetermined voltage to the other end of the first capacitor, at the reset of the photodiode, the injection voltage is supplied to the one end of the peak hold transistor, and the first switch transistor is turned on to supply the predetermined voltage to the other end of the first capacitor and to inject the charges to the first capacitor and the second capacitor, and then, after supply of the reset voltage and the injection voltage is stopped, the first switch transistor is turned off to cause the first capacitor to hold the voltage that corresponds to the output of the photodiode immediately after the reset and is reversed in positive and negative, after the predetermined exposure period elapses in a state where the second switch transistor is turned on, the second switch transistor is turned off to cause the second capacitor to hold the voltage corresponding to the light incident amount in the exposure period, and a voltage is obtained by subtracting the voltage held by the first capacitor from the voltage held by the second capacitor on the other side of the second capacitor, and is applied to the control end of the output transistor to output the image signal from the output end.

32. The image sensor according to claim 19, wherein each of the pixels further includes a peak hold transistor configured to allow a current to flow there through based on the output voltage of the photodiode, an injection power supply connected to one end of the peak hold transistor and configured to supply an injection voltage, a second switch transistor including one end connected to another end of the peak hold transistor, a first capacitor including one end connected to another end of the second switch transistor, a second capacitor including one end connected to another end of the first capacitor, an output transistor including a control end connected to the other end of the first capacitor, and a first switch transistor configured to supply a predetermined voltage to the other end of the first capacitor, at the reset of the photodiode, the injection voltage is supplied to the one end of the peak hold transistor, and the first switch transistor is turned on to supply the predetermined voltage to the other end of the first capacitor and to inject the charges to the first capacitor and the second capacitor, and then, after supply of the reset voltage and the injection voltage is stopped, the first switch transistor is turned off to cause the first capacitor to hold the voltage that corresponds to the output of the photodiode immediately after the reset and is reversed in positive and negative, after the predetermined exposure period elapses in a state where the second switch transistor is turned on, the second switch transistor is turned off to cause the second capacitor to hold the voltage corresponding to the light incident amount in the exposure period, and a voltage is obtained by subtracting the voltage held by the first capacitor from the voltage held by the second capacitor on the other side of the second capacitor, and is applied to the control end of the output transistor to output the image signal from the output end.

33. The image sensor according to claim 19, wherein, during a same signal integration period in one frame period, signals are accumulated in the first capacitors of the respective pixels, and are then output horizontal line by horizontal line.

34. The image sensor according to claim 33, wherein the one frame period is divided into a signal integration period and a readout period after the signal integration period, and the signals accumulated in the first capacitors of the respective pixels during the integration period are sequentially output line by line.

35. The image sensor according to claim 33, wherein the pixels are divided into an odd-numbered row group and an even-numbered row group, in an odd-numbered frame, the signals and the noise are accumulated in the pixels of the odd-numbered row group, and the signals and the noise accumulated in a previous frame are output from the pixels of the even-numbered row group, and in an even-numbered frame, the signals and the noise are accumulated in the pixels of the even-numbered row group, and the signals and the noise are output from the pixels of the odd-numbered row group.

36. The image sensor according to claim 33, wherein in each frame, in each of the pixels, the signal is accumulated in the first capacitor, and then, the signal accumulated in the first capacitor is transferred to a corresponding first transfer capacitor, in each of the pixels, the noise is accumulated in the second capacitor, and then, the noise accumulated in the second capacitor is transferred to a corresponding second transfer capacitor, and the signal and the noise transferred in the previous frame and held are output from the first and second transfer capacitors.

37. The image sensor of claim 1, wherein each of the pixels further comprises a bias transistor (BT) coupled between the drain terminal of the PH and a hole supply, and wherein the BT is a p-channel transistor.

38. The image sensor of claim 1, further comprising a first selection transistor (SEL1) and a second selection transistor (SEL2), wherein a gate of the first selection transistor and a gate of the second selection transistor are connected in common, and are supplied with a row selection signal.

* * * * *